United States Patent
Hironaka et al.

(10) Patent No.: US 9,432,749 B2
(45) Date of Patent: Aug. 30, 2016

(54) COMMUNICATION SYSTEM, COMMUNICATION CONTROL METHOD, AND TRANSMISSION APPARATUS

(71) Applicant: FUJITSU LIMITED, Kawasaki-shi, Kanagawa (JP)

(72) Inventors: Shingo Hironaka, Kawasaki (JP); Takashi Honda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 14/251,975

(22) Filed: Apr. 14, 2014

(65) Prior Publication Data

US 2014/0363152 A1  Dec. 11, 2014

(30) Foreign Application Priority Data

Jun. 5, 2013  (JP) .................... 2013-119003

(51) Int. Cl.
*H04Q 11/00* (2006.01)
*G02F 1/00* (2006.01)
*H04L 12/24* (2006.01)
*H04B 10/032* (2013.01)
*H04J 3/16* (2006.01)

(52) U.S. Cl.
CPC ........ *H04Q 11/0005* (2013.01); *H04B 10/032* (2013.01); *H04J 3/1652* (2013.01); *H04Q 2011/0043* (2013.01)

(58) Field of Classification Search
CPC ................ H04Q 11/0005; H04Q 2011/0043; H04J 3/085
USPC ........................................ 398/5, 1
See application file for complete search history.

(56) References Cited

U.S. PATENT DOCUMENTS

| | | | | |
|---|---|---|---|---|
| 5,793,745 A | * | 8/1998 | Manchester | H04J 3/085 370/224 |
| 8,983,286 B2 | * | 3/2015 | Youn | H04B 10/032 398/118 |
| 9,161,106 B2 | * | 10/2015 | Sun | H04Q 11/0062 |
| 2002/0089712 A1 | * | 7/2002 | Kang | H04B 10/032 398/1 |
| 2004/0190444 A1 | * | 9/2004 | Trudel | H04J 3/085 370/224 |
| 2006/0256712 A1 | | 11/2006 | Imajuku et al. | |
| 2013/0121140 A1 | * | 5/2013 | Ryoo | H04L 41/0668 370/228 |
| 2013/0294228 A1 | * | 11/2013 | Ahuja | H04L 41/0654 370/228 |
| 2014/0355424 A1 | * | 12/2014 | Rao | H04L 47/12 370/228 |
| 2014/0363152 A1 | * | 12/2014 | Hironaka | H04Q 11/0005 398/5 |

FOREIGN PATENT DOCUMENTS

WO  WO2004/075494  9/2004

* cited by examiner

*Primary Examiner* — Oommen Jacob
(74) *Attorney, Agent, or Firm* — Fujitsu Patent Center

(57) ABSTRACT

A communication system includes a source node and an end node of a first working path, a source node and an end node of a second working path, and a source node and an end node of a common path serving as a protection path shared by the first and second working paths. The source node of the common path transfers one of signals received from the source nodes of the first and second working paths to the common path, and the end node of the common path transmits the signal received through the common path to each of the end nodes of the first and second working paths.

10 Claims, 39 Drawing Sheets

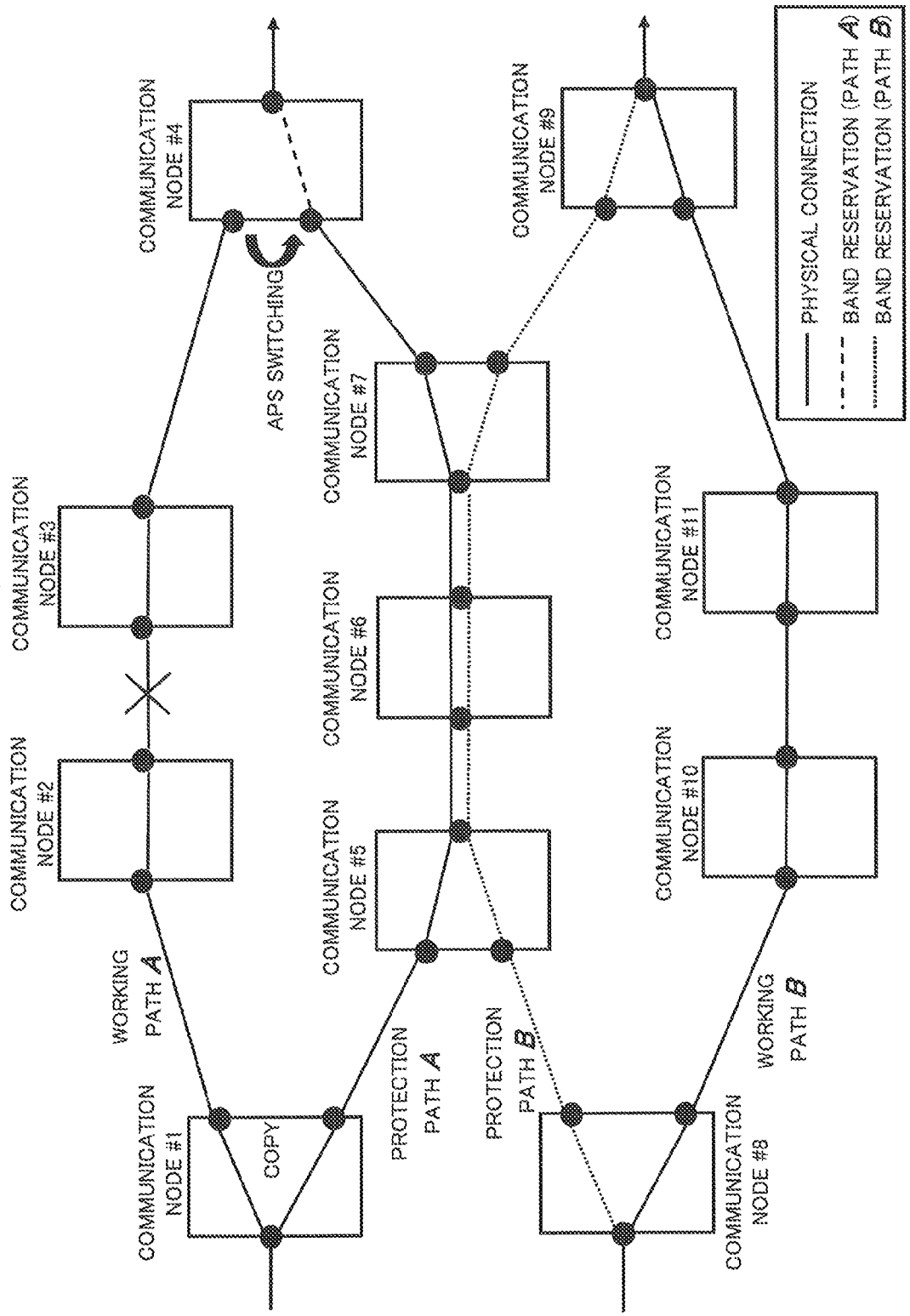

COMMUNICATION SYSTEM, COMMUNICATION CONTROL METHOD, AND TRANSMISSION APPARATUS

CROSS-REFERENCE TO RELATED APPLICATIONS

This application is based upon and claims the benefit of priority of the prior Japanese Patent Application No. 2013-119003, filed on Jun. 5, 2013, the entire contents of which are incorporated herein by reference.

FIELD

The embodiment discussed herein is related to a communication system, a communication control method, and a transmission apparatus.

BACKGROUND

In recent years, an optical transport network (OTN) is being standardized in International Telecommunication Union-Telecommunication sector (ITU-T) and Institute of Electrical and Electronic Engineers (IEEE).

The OTN can transmit different kinds of client signals in a transparent manner in an optical network to which a wavelength division multiplexing (WDM) technique is applied.

As a method that is high in reliability on a failure and capable of effectively using network resources in the OTN, there is a shared restoration scheme (for example, see WO2004/075494).

In the shared restoration scheme, a band of a protection path placed in a route completely different from a working path is secured in advance, and a band of one protection path is shared by a plurality of working paths. When a failure occurs in the working path, a control signal such as an automatic protection switching (APS) signal is transmitted in the protection path to secure a physical connection of the protection path and perform switching from the working path to the protection path.

FIG. 37 illustrating an exemplary network configuration in the shared restoration scheme. For example, a network illustrated in FIG. 37 includes communication nodes #1 to #11, and the communication nodes #1 to #11 are connected in a mesh form, for example.

A working path A is set to a route passing through the communication nodes #1, #2, #3, and #4. Further, a working path B is set to a route passing through the communication nodes #8, #10, #11, and #9. For each of the working path A and the working path B, a physical connection setting is secured in the corresponding communication node #j (j=one of 1 to 11).

Meanwhile, a protection path A for the working path A is set to a route passing through the communication nodes #1, #5, #6, #7, and #4. Further, a protection path B for the working path B is set to a route passing through the communication nodes #8, #5, #6, #7, and #9.

The protection paths A and B are in a state in which a physical connection setting has not been secured in the corresponding communication node #j but a band has been reserved. Further, between the communication node #5 and the communication node #7, reserved bands of the protection paths A and B are shared by the working path A and the working path B.

When a failure occurs in the working path A (or the working path B), path switching is performed so that a signal (traffic) which has been transmitted through the working path A (or the working path B) is available to be transmitted through the protection path A (or the protection path B).

Here, WO2004/075494 discloses a method of switching a path quickly in the shared restoration scheme. FIG. 38 illustrates an exemplary network configuration before a failure occurs, and FIG. 39 illustrates an exemplary network configuration when a single failure occurs.

As illustrated in FIG. 38, a physical connection setting is secured before a failure occurs in each of the communication nodes #1, #5, #6, #7, and #4 positioned in the route through which the protection path A passes. Meanwhile, in each of the communication nodes #8, #5, #6, #7, and #9 positioned in the route through which the protection path B passes, a physical connection setting is not secured, and a protection path band is reserved.

Further, a failure is assumed to occur in the working path A (for example, between the communication nodes #2 and #3) as illustrated in FIG. 39. In this case, since physical connection is secured between the communication nodes #1 and #4 respectively corresponding to a source node and an end node of the protection path A, by performing an APS switching process in the end node #4, fast path switching from the working path A to the protection path A can be performed.

However, when a failure occurs in the working path B, a physical connection setting is not secured in the protection path B. Thus, it is necessary to transmit a control signal such as an APS signal from the communication node #8 to the communication node #9 through the communication nodes #5 to #7 to secure the physical connection setting of the protection path B. After the physical connection setting of the protection path B is secured, switching the working path B to the protection path B is performed.

As described above, in the shared restoration scheme, among a plurality of working paths sharing the protection path, only one working path can secure the physical connection in the protection path in advance. Thus, when a failure occurs in the working path that does not secure the physical connection in the protection path in advance, since it is necessary to transmit a control signal after detecting the failure, and thus it is unavailable to switch the working path to the protection path quickly.

SUMMARY

An aspect of a communication system includes a source node and an end node of a first working path, a source node and an end node of a second working path, and a source node and an end node of a common path serving as a protection path shared by the first and second working paths, wherein the source node of the common path transfers one of signals received from the source nodes of the first and second working paths to the common path, and the end node of the common path transmits the signal received through the common path to each of the end nodes of the first and second working paths.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 39 is a diagram illustrating an exemplary network configuration when a single failure occurs in the network configuration illustrated in FIG. 38.

DESCRIPTION OF EMBODIMENT

Figure 1:
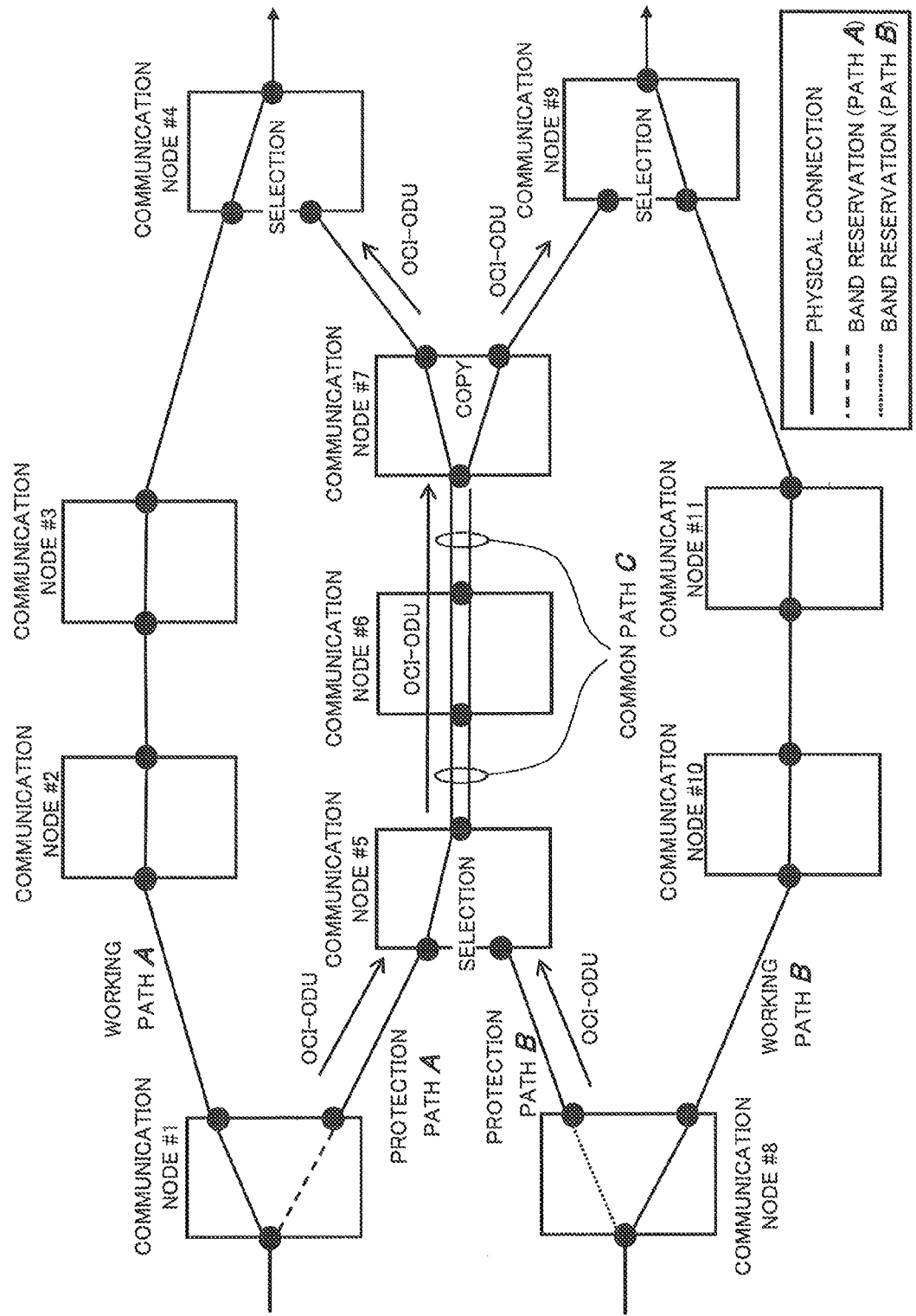
FIG. 1 is a diagram illustrating an exemplary configuration of a communication network according to an embodiment.

Hereinafter, an embodiment will be described with reference to the appended drawings. Here, the following descriptions are merely an example and not intended to exclude applications of various modifications or techniques which are not described below. In the drawings used in the following embodiment, parts denoted by the same reference numerals represent the same or similar parts unless otherwise set forth herein.

FIG. 1 is a diagram illustrating an exemplary configuration of a communication network according to an embodiment. The communication network illustrated in FIG. 1 includes, for example, a plurality of communication nodes #1 to #11 each of which serves as an example of a transmission apparatus. The communication nodes #1 to #11 are connected, for example, in a mesh form and form a mesh network.

The communication node #1 corresponds to a source node of the working path A and the protection path A for the working path A. The working path A is an example of a first working path, and is set to start from the source node #1 and arrive at the communication node #4 through the communication node #2 and the communication node #3. In other words, in each of the communication nodes #1, #2, #3, and #4, a physical connection setting (for example, a cross connect setting) on the working path A is available.

The communication node #8 corresponds to a source node of the working path B and the protection path B for the working path B. The working path B is an example of a second working path, and is set to start from the source node #8 and arrive at the communication node #9 through the communication node #10 and the communication node #11. In other words, in each of the communication nodes #8, #10, #11, and #9, a physical connection setting (for example, a cross connect setting) on the working path B is available.

The protection path A is, for example, set to start from the source node #1 of the working path A and arrive at the communication node #4 corresponding to the end node of the working path A through the communication nodes #5, #6, and #7. In other words, a physical connection is secured in the protection path A, and it is available to transmit a signal through the protection path A.

Here, during the normal operation, in the source node #1, a physical connection setting on the protection path A has not been made (see a dotted line) but a band reservation for the protection path A has been made. When a failure occurs in the working path A, the source node #1 releases the physical connection setting on the working path A and performs the physical connection setting using the reserved band for the protection path A. Thereby, the signal having been transmitted to the working path A can be transmitted to the protection path A (the communication node #5).

Similarly, the protection path B is set to start from the source node #8 of the working path B and arrive at the communication node #9 corresponding to the end node of the working path B through the communication nodes #5, #6, and #7. In other words, a physical connection is secured in the protection path B, and it is available to transmit a signal through the protection path B.

However, during the normal operation, in the source node #8, a physical connection setting on the protection path B has not been made (see a dotted line), but a band reservation for the protection path B has been made. When a failure occurs in the working path B, the source node #8 releases the physical connection setting on the working path B and performs a physical connection setting using the reserved band for the protection path B. Thereby, the signal transmitted to the working path B can be transmitted to the protection path B (the communication node #5).

The protection path A and the protection path B are partially common, for example, between the communication nodes #5 and #7. In other words, the communication node #5 corresponds to the source node of a common path C serving as a protection path shared by the working paths A and B. Further, the communication node #7 corresponds to the end node of the common path C. A physical connection has been set to the common path C.

In other words, between the communication node #5 serving as the source node of the common path C and the communication node #6 serving as an intermediate node of the common path C, the physical connection setting has been made so that a signal can be communicated through the common path C. Similarly, between the intermediate node #6 of the common path C and the communication node #7 serving as the end node of the common path C, the physical connection setting has been made so that a signal can be communicated through the common path C.

The source node #5 of the common path C transmits one of signals each of which received through a plurality of protection paths A and B to the common path C. In other words, the source node #5 of the common path C connects one of the protection paths A and B to the common path C. Thus, in the common path C, one of the signal of the protection paths A and B is transmitted toward the communication node #7.

In the end node #7 of the common path C, a physical connection setting has been made on each of the end node #4 of the working path A and the end node #9 of the working path B. In other words, the end node #7 of the common path C is in a state available to transmit the signal to each of the end nodes #4 and #9. At this time, the end node #7 of the common path C is operable to copy the signal received through the common path C and to transmit the signal to each of the end nodes #4 and #9.

The end node #4 of the working path A is operable to receive the signal transmitted from the working path A (the communication node #3) and the signal transmitted from the protection path A through the common path C (the end node #7) and to output one of the received signals. Similarly, the end node #9 of the working path B is operable to receive the signal transmitted from the working path B (the communication node #11) and the signal transmitted from the protection path B through the common path C (the communication node #7) and to output one of the received signals.

FIG. 1 illustrates the two communication nodes #2 and #3 each of which serves as the intermediate node through which the working path A passes However, three or more intermediate nodes may be provided or no intermediate node may be provided for the working path A. Similarly, three or more intermediate nodes may be provided or no intermediate node provided for the working path B. Further, FIG. 1 illustrates the single communication node #6 serving as the intermediate node through which the common path C passes. However, two or more intermediate nodes may be provided or no intermediate node provided for the common path C.

In the network configuration described above, during the normal operation, the communication node #1 transmits a received user signal (user traffic) to the working path A, and the communication node #8 transmits a received user traffic to the working path B. The user traffic is an example of a client signal which may correspond to, for example, an ODUk (k=0, 1, 2, 3, 4, and so on) mapped to an OTN frame.

Meanwhile, the communication node #1 transmits an alarm signal to the protection path A, and the communication node #8 transmits the alarm signal to the protection path B. The alarm signal is an example of a dummy signal which may correspond to, for example, an open connection indication-ODUk (OCI-ODUk) alarm representing that the user traffic is in a non-connection status.

Thus, during the normal operation, the communication node #5 receives the alarm signal (for example, the OCI-ODUk alarm) from each of the source nodes #1 and #8 of the respective working paths A and B. The communication node #5 selects one of the received alarm signals according to a predetermined priority and transmits the selected alarm signal to the common path C. In the example of FIG. 1, the communication node #5 selects the OCI-ODUk alarm received through the protection path A and transmits the OCI-ODUk alarm to the common path C.

The OCI-ODUk alarm is transmitted through the common path C in the order of the communication nodes #6 and #7.

The end node #7 of the common path C copies the OCI-ODUk alarm received through the common path C and transmits the OCI-ODUk alarm to each of the end nodes #4 and #9 of the working paths A and B.

Thereby, the end node #4 of the working path A receives the user traffic from the working path A (the communication node #3) and receives the alarm signal from the protection path A (the end node #7 of the common path C). The end node #4 selects the user traffic received from the working path A, which is not an alarm signal, and outputs the selected user traffic.

Similarly, the end node #9 of the working path B receives the user traffic from the working path B (the communication node #11) and receives the alarm signal from the protection path B (the end node #7 of the common path C). The end node #9 selects the user traffic received from the working path B, which is not an alarm signal, and outputs the selected user traffic.

In the above example, the source node #1 (or #8) of the working path A (or B) transmits the alarm signal that is an example of the dummy signal to the protection path A (or B). However, the source node #1 (or #8) may transmit a signal which is not an alarm signal but, for example, the same signal as the signal transmitted to the working path A (or B).

(Exemplary Configuration of Communication Node)

Figure 2:
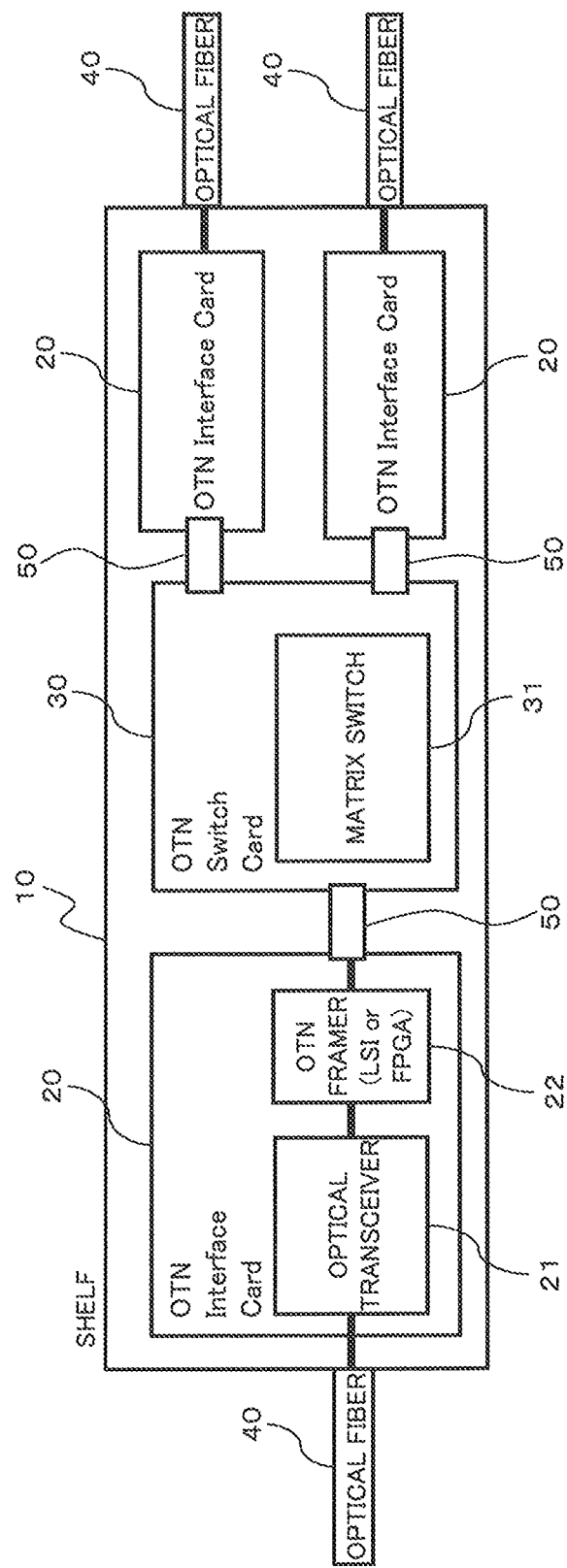
FIG. 2 is a diagram illustrating an exemplary hardware configuration of a communication node illustrated in FIG. 1.
Figure 3:
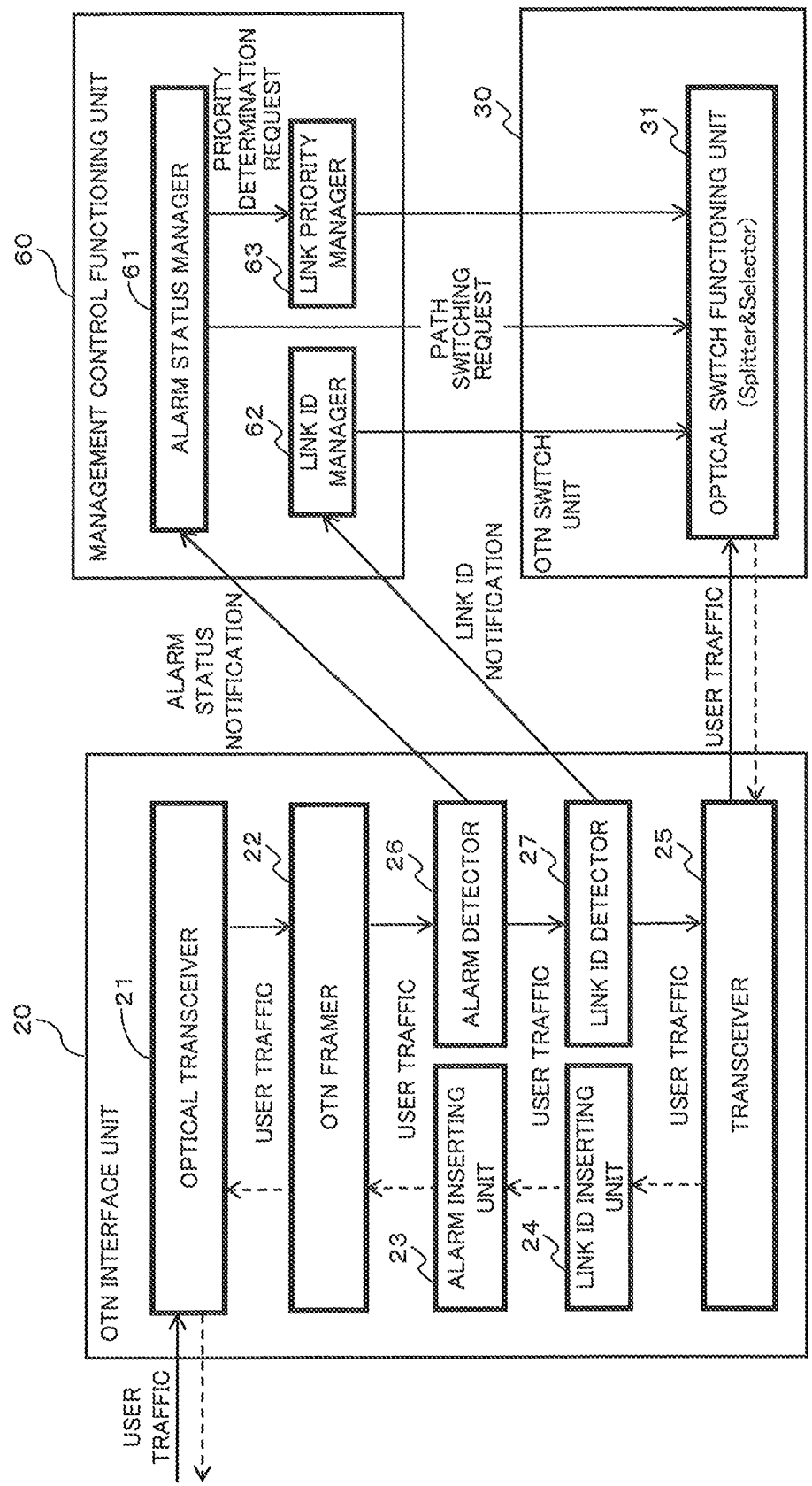
FIG. 3 is a functional block diagram illustrating a communication node illustrated in FIG. 1.

FIG. 2 is a diagram illustrating an exemplary hardware configuration of the communication node #j (j=any one of 1 to 11) illustrated in FIG. 1, and FIG. 3 is a functional block diagram illustrating the communication node #j illustrated in FIG. 1.

The communication node #j illustrated in FIG. 2 includes, for example, a plurality of OTN interface cards (OTN interface units) 20 each of which an optical fiber (optical transmission line) 40 is connected to and an OTN switch card (OTN switch unit) 30 in a shelf 10. Each of the OTN interface cards 20 is connected with the OTN switch card 30 through an interconnection 50. An optical signal inputted to a first OTN interface card 20 through any one of optical fibers 40 is switched its output destination corresponding to another second OTN interface card 20 at the OTN switch card 30. The switched signal is outputted from the second OTN interface card 20 to the corresponding optical fiber 40.

For this, the OTN switch card 30 includes, for example, a matrix switch (an optical switch functioning unit) 31, and the OTN interface card 20 includes, for example, an optical transceiver 21 and an OTN framer 22. The OTN framer 22 can be implemented, for example, using an LSI or an FPGA.

The OTN framer 22 performs multi-mapping (or multiplexing) and multi-demapping (or demultiplexing) on an ODUk frame compatible with ITU-T recommendation G.709. For example, an ODU frame to which a user traffic of Ethernet (a registered trademark) is mapped may be referred to as a lower order ODU (LO-ODU), and an ODU frame to which a plurality of ODU frames is mapped may be referred to as a higher order ODU (HO-ODU). For example, ODU1 may be multiplexed into a HO-ODUk frame (for example, ODU2, ODU3, ODU4, and so on) which has a signal speed higher than the ODU 1.

Figure 4:
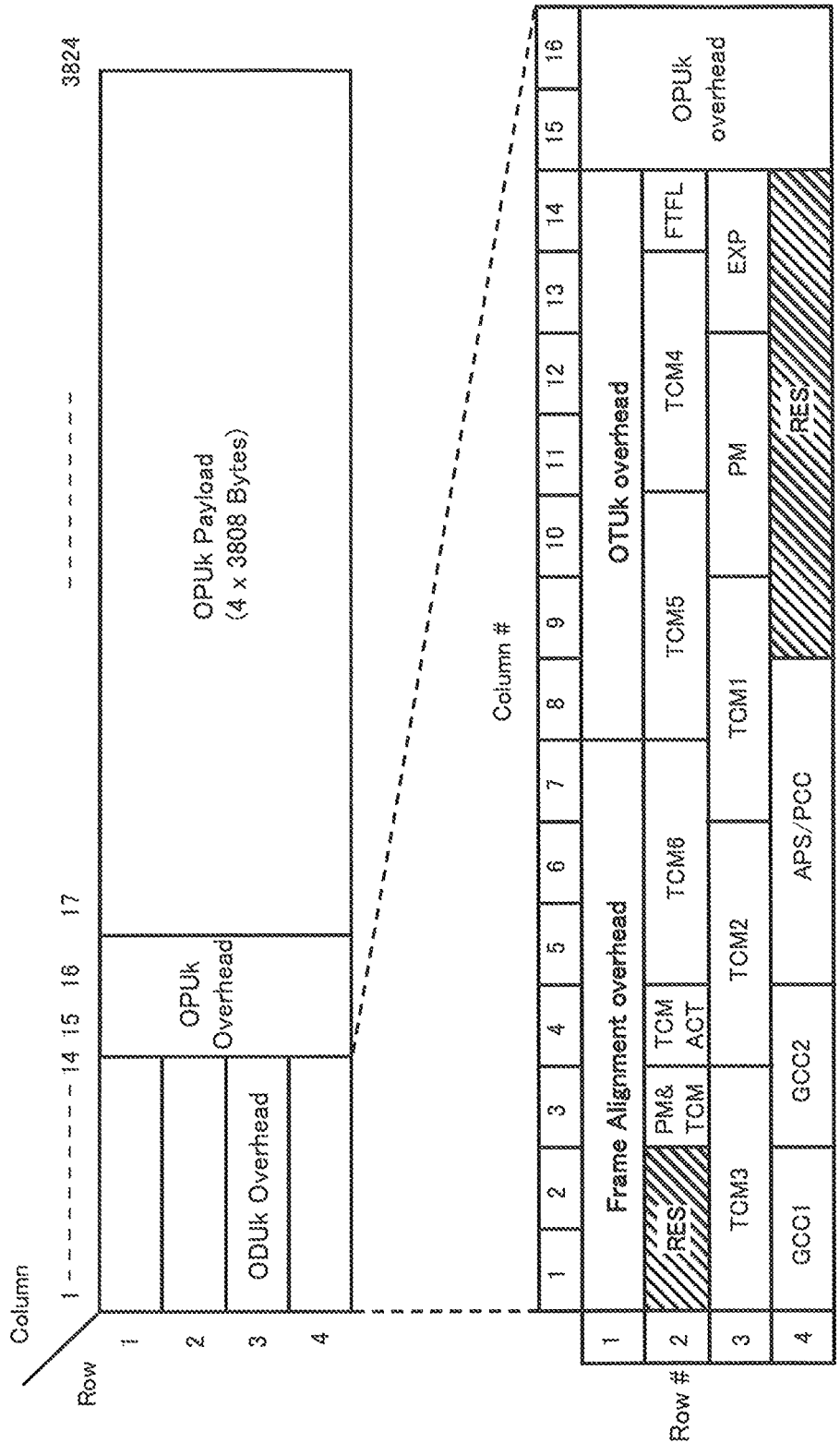
FIG. 4 is a diagram illustrating an exemplary format of an ODUk frame compatible to the ITU-T recommendation G.709.

FIG. 4 illustrates an exemplary format of an ODUk frame compatible with ITU-T recommendation G.709. The ODUk frame includes an overhead field with the size of 16 bytes of 1st to 16-th columns×4 rows and a payload field referred to as an optical channel payload unit k (OPUk) with the size of 3808 bytes of 17-th to 3824-th columns×4 rows.

The overhead field includes a frame alignment (FA) overhead, an OTUk overhead, an ODUk overhead, and an optical channel payload unit k (OPUk) overhead, and is used for connection and quality management. The ODUk may be mapped into any one of time slots (tributary slots (TS)) obtained by dividing a payload field (an OPUk payload area) of a HO-ODUk frame, for example, in units of bytes. Thereby, the mapping of the ODUk into the HO-ODUk can be achieved.

Abbreviation terms indicated in FIG. 4 mean the followings:

PM: Path Monitoring
TCM: Tandem Connection Monitoring
RES: Reserved for future international standardization
ACT: Activation/deactivation control channel
FTFL: Fault Type & Fault Location reporting channel
EXP: Experiment
GCC: General Communication Channel
APS: Automatic Protection Switching coordination channel
PCC: Protection Communication Control channel In the present embodiment, as will be described later, the source nodes #1 and #8 insert link identification information (link ID) of the user traffic into the RES field. Thus, each of the end nodes #4 and #9 is available to determine whether or not the user traffic is allowed to transfer based on the link ID inserted in the RES field.

Focusing on functions of the communication node #j, the communication node #j includes, for example, an OTN interface unit 20, a management control functioning unit 60, and an OTN switch unit 30, as illustrated in FIG. 3.

The OTN interface unit 20 includes an optical transceiver 21, the OTN framer 22, an alarm inserting unit 23, a link ID inserting unit 24, a transceiver 25, an alarm detector 26, and a link ID detector 27.

The management control functioning unit 60 controls the physical connection setting (the cross connect setting or the like) on the OTN switch unit 30. For example, in the communication node #5 serving as the source node of the common path C and the communication node #7 serving as the end node of the common path C, the management control functioning unit 60 functions as an example of a connection setting unit operable to secure the physical connection setting on the common path C.

For example, the management control functioning unit 60 includes an alarm status manager 61, a link ID manager 62, and a link priority manager 63.

The OTN switch unit 30 performs the cross connect setting or the like according to the connection setting given by the management control functioning unit 60. In the source node #5 of the common path C, the OTN switch unit 30 functions as an example of a signal transfer unit operable to transfer one of the signals (the first and second signals) received from the source node #1 and #8 (the first and second nodes) of the working paths A and B to the common path C (the communication node #5). Further, in the end node #7 of the common path C, the OTN switch unit 30 functions as an example of a transmitter operable to transmit the signal received from the communication node #6 at the upstream side to each of the end nodes #4 and #9 of the working paths A and B through the common path C.

The OTN switch unit 30 includes, for example, an optical switch functioning unit 31. The optical switch functioning unit 31 includes a splitter and a selector as will be described later.

In the OTN interface unit 20, the optical transceiver 21 transceiver the OTN frame including the user traffic (client signal).

The OTN framer 22 is operable to perform the multi-mapping (or multiplexing) and multi-demapping (or demultiplexing) on the ODUk frame as described previously.

The alarm inserting unit 23 is operable to insert an alarm signal such as an OCI-ODUk alarm, a backward defect indication-ODUk (BDI-ODUk) alarm which will be described later, or an AIS-ODUk alarm into an OTN frame.

The OCI-ODUk alarm may be indicated, for example, by a signal in which the entire of the ODUk frame other than an FA overhead, an OTUk overhead, and an FTFL field which are illustrated in FIG. 4 is set to a predetermined repetition pattern (for example, "0110 0110").

The BDI-ODUk alarm is inserted into a section monitoring (SM) field defined in the FA overhead illustrated in FIG. 4 and indicates a signal failure (backward defect) with "1", for example.

The AIS-ODUk alarm is indicated by a signal in which the entire of the ODUk frame other than the FA overhead, the OTUk overhead, and the FTFL field illustrated in FIG. 4 is set to all "1".

The link ID inserting unit 24 functions as an example of a link identification information allocator operable to insert (or allocate) a link ID related to the working path A or B into the user traffic (client signal). The link ID inserting unit 24 is operable to insert the link ID into the RES field as described previously. For example, the link ID may be managed by the link ID manager 62 of the management control functioning unit 60.

The transceiver 25 is operable to transceive a signal between the OTN interface unit 20 and the OTN switch unit 30.

The alarm detector 26 is operable to detect the OCI-ODUk alarm, the BDI-ODUk alarm, and the AIS-ODUk. An alarm detection result (alarm status) indicating whether the alarm is detected or not may be notified to the alarm status manager 61 of the management control functioning unit 60. In the source nodes #1 and #8 of the working paths A and B, the alarm detector 26 functions as an example of a failure detector operable to detect the BDI-ODUk alarm to thereby detect a failure of the working path.

The link ID detector 27 is operable to detect the link ID inserted into the RES field of the received user traffic. The detected link ID may be notified to the link ID manager 62 of the management control functioning unit 60.

Focusing on the source nodes #1 and #8 of the working paths A and B, the optical transceiver 21, the OTN framer 22, the transceiver 25, and the OTN switch unit 30 function as an example of first and second transmitters. The first transmitter is operable to transmit the client signal to the working path A or B. The second transmitter is operable to transmit the OCI-ODUk alarm that is an example of the dummy signal to the common path C (the communication node #5) serving as the protection path shared by the working path A (or B) and another working path B (or A). Further, the second transmitter is operable to stop transmitting the OCI-ODUk alarm and to transmit the received client signal to the source node #5 of the common path C, in response to a detection of the BDI-ODUk alarm in the alarm detector 26.

Meanwhile, focusing on the end nodes #4 and #9 of the working paths A and B, the OTN interface unit 20 has a function as a first receiver operable to receive a first signal transmitted through the working path A or B. Further, the OTN interface unit 20 has a function as a second receiver operable to receive a second signal transmitted through the common path C serving as the protection path shared by the working path A (or B) and another working path B (or A).

In this case, the OTN switch unit 30 functions as an example of a signal transfer unit operable to transfer one of the first and second signals received by the first and second receivers. Further, the second receiver operable to receive, from the common path C, the same signal as the signal transmitted to another node node#9 (or #4) that receives the signal transmitted through another working path B (or A).

Further, focusing on the source node #5 of the common path C, the OTN interface unit 20 has a function as a first receiver operable to receive a first signal from the first node #1 that transmits the signal to the first working path A. Further, the OTN interface unit 20 has a function as a second receiver operable to receive a second signal from the second node #8 that transmits the signal to the second working path B. Further, the first receiver is operable to receive the client signal transmitted through the first working path A from the first node #1 in response to a failure occurring in the first working path A. Upon receiving the client signal and the second signal, the signal transfer unit is operable to transfer the client signal to the common path C.

Further, focusing on the end node #7 of the common path C, the OTN interface unit 20 has a function as a receiver operable to receive the signal transmitted through the common path C serving as the protection path shared by the first working path A and the second working path B. The OTN switch unit 30 of the end node #7 functions as an example of a transmitter operable to transmit the signal received by the receiver to both of the communication node #4 and communication node #9. In this case, the communication node #4 corresponds to the first node that receives the signal transmitted through the first working path A, and the communication node #9 corresponds to the second node that receives the signal transmitted through the second working path B.

Next, in the management control functioning unit 60, the alarm status manager 61 is operable to manage the alarm detection result obtained by the alarm detector 26. The alarm status manager 61 is also operable to transmit a path switching request to the optical switch functioning unit 31 of the OTN switch unit 30 according to the alarm detection result.

For example, when the AIS-ODUk alarm or the BDI-ODUk alarm is detected in the working path A (or B), a request to switch the working path A (or B) to the protection path A (or B) is transmitted to the optical switch functioning unit 31. Further, for example, when the AIS-ODUk alarm or the BDI-ODUk alarm is canceled in the working path A (or B), a request to switch (switch back) the protection path A (or B) to the working path A (or B) is transmitted to the optical switch functioning unit 31.

When the OCI-ODUk alarm is detected, the alarm status manager 61 transfers a priority determination request to the link priority manager 63.

The link priority manager 63 is operable to determine (select) a path signal to be transferred to the downstream side according to a predetermined link priority and to transfer the path switching request according to the selection result to the optical switch functioning unit 31, in response to a reception of the priority determination request transmitted from the alarm status manager 61.

For example, since the communication node #5 illustrated in FIG. 1 receives the OCI-ODUk alarm through both of the protection paths A and B, the link priority manager 63 selects a protection path through which the received alarm is to be transferred to the downstream communication node #6 according to the link priority. In the example of FIG. 1, since the protection path A is higher in the link priority than the protection path B, the protection path A is selected. Further, in the end nodes #4 and #9 illustrated in FIG. 1, the link priority manager 63 selects the working paths A and B from which the OCI-ODUk alarm is not received.

The link ID manager 62 is operable to manage an link ID transferable to the downstream, to compare the link ID with the link ID notified from the link ID detector 27, and to determine whether the user traffic including the corresponding link ID is allowed to transfer to the downstream (whether to transfer or not). The link ID manager 62 is also operable to give a path switching request to the optical switch functioning unit 31 according to the determination result.

For example, as will be described later, there are cases in which a failure occurs in either or both of the working paths A and B illustrated in FIG. 1 and the user traffic including the same link ID is transferred from the communication node #7 to each of the end nodes #4 and #9. In this case, the end nodes #4 and #9 select a path signal to be transferred to the downstream based on the link ID.

Next, in the OTN switch unit 30, the optical switch functioning unit 31 is operable to perform the cross connect setting for input and output signals according to the path switching request given from the management control functioning unit 60. The cross connect setting is available for TS units of the ODUk frame.

Figure 5:
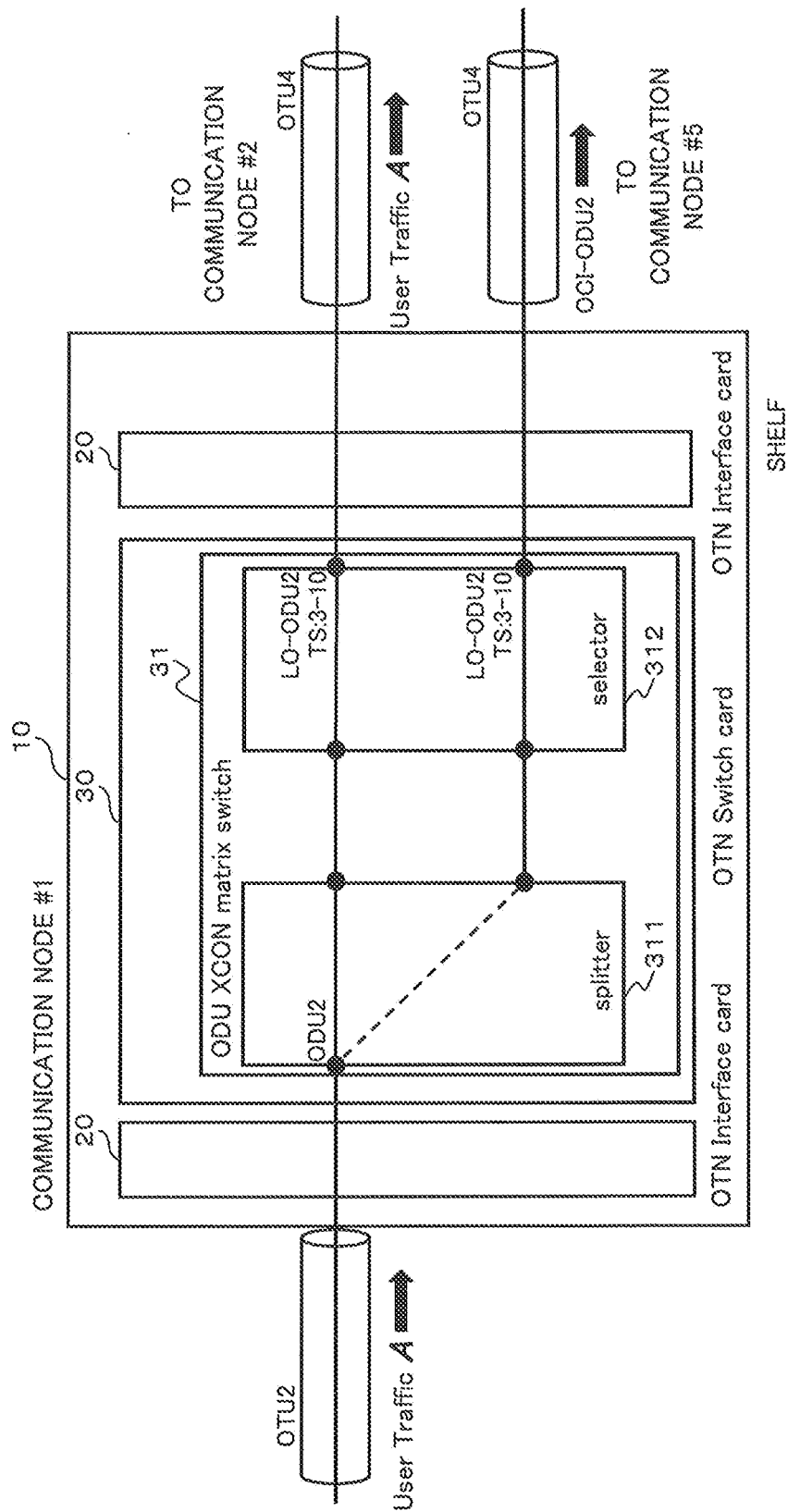
FIG. 5 is a diagram schematically illustrating a cross connect setting in a communication node #1 illustrated in FIG. 1.
Figure 6:
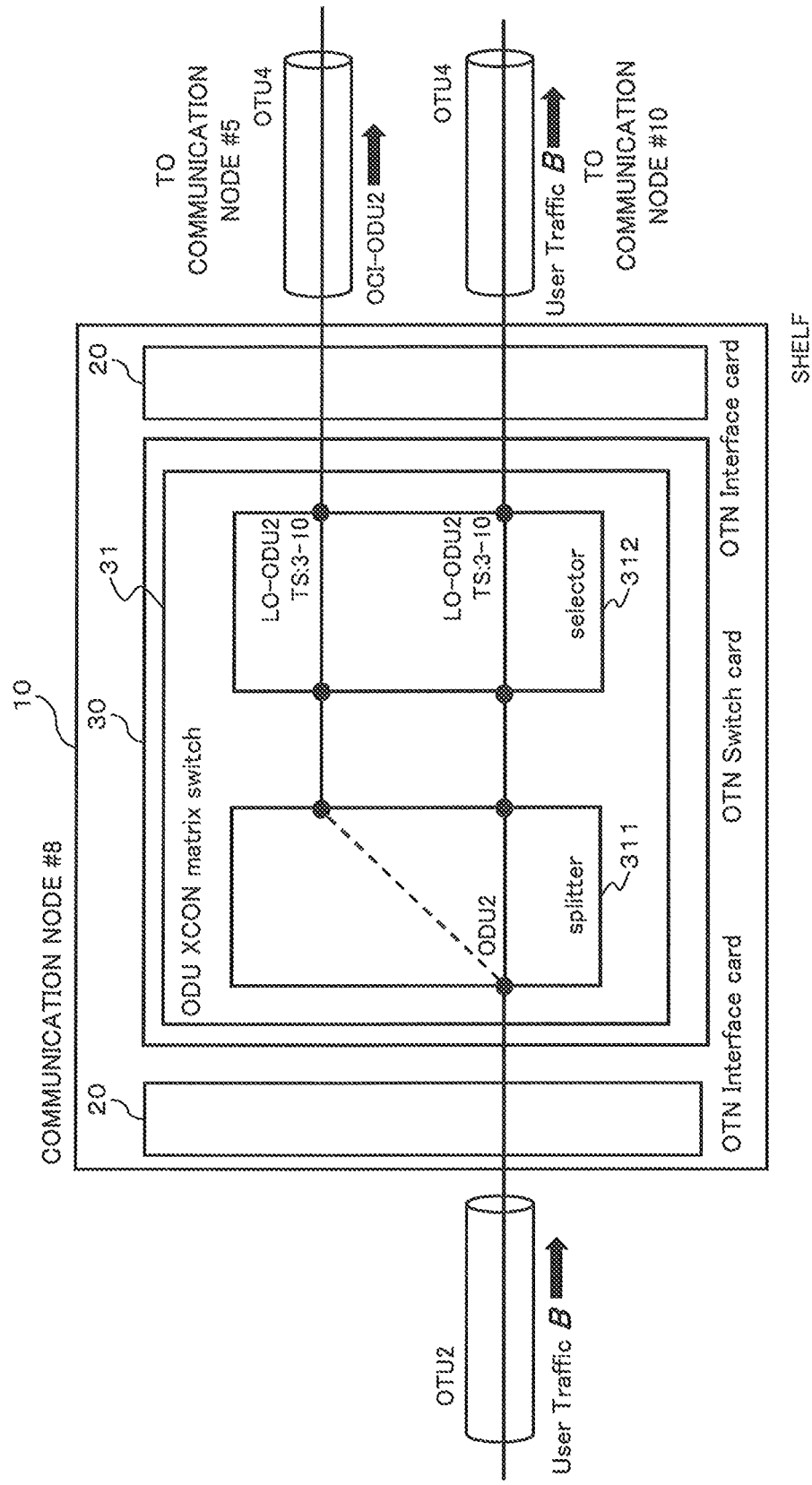
FIG. 6 is a diagram schematically illustrating a cross connect setting in a communication node #8 illustrated in FIG. 1.
Figure 7:
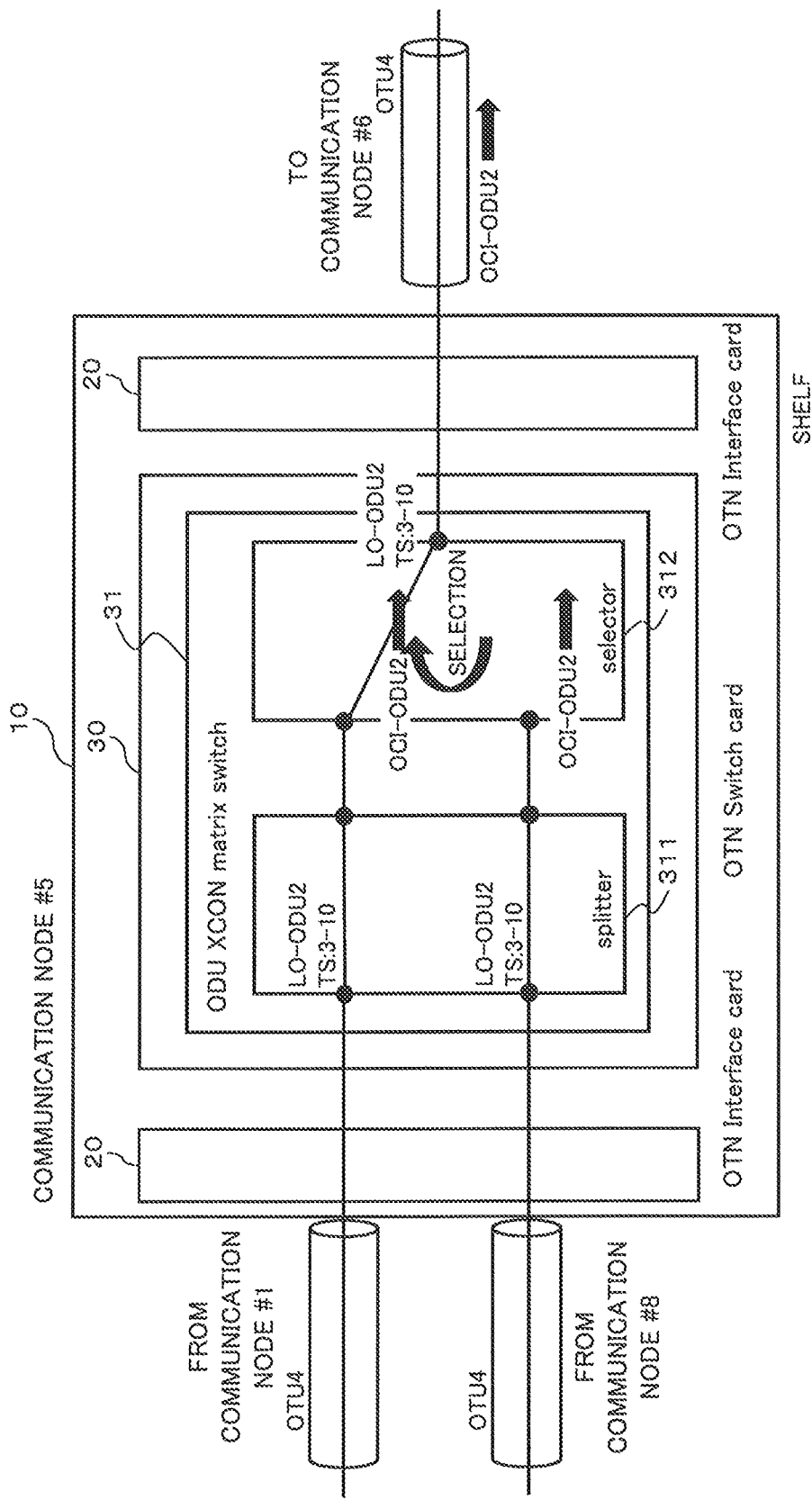
FIG. 7 is a diagram schematically illustrating a cross connect setting in a communication node #5 illustrated in FIG. 1.
Figure 8:
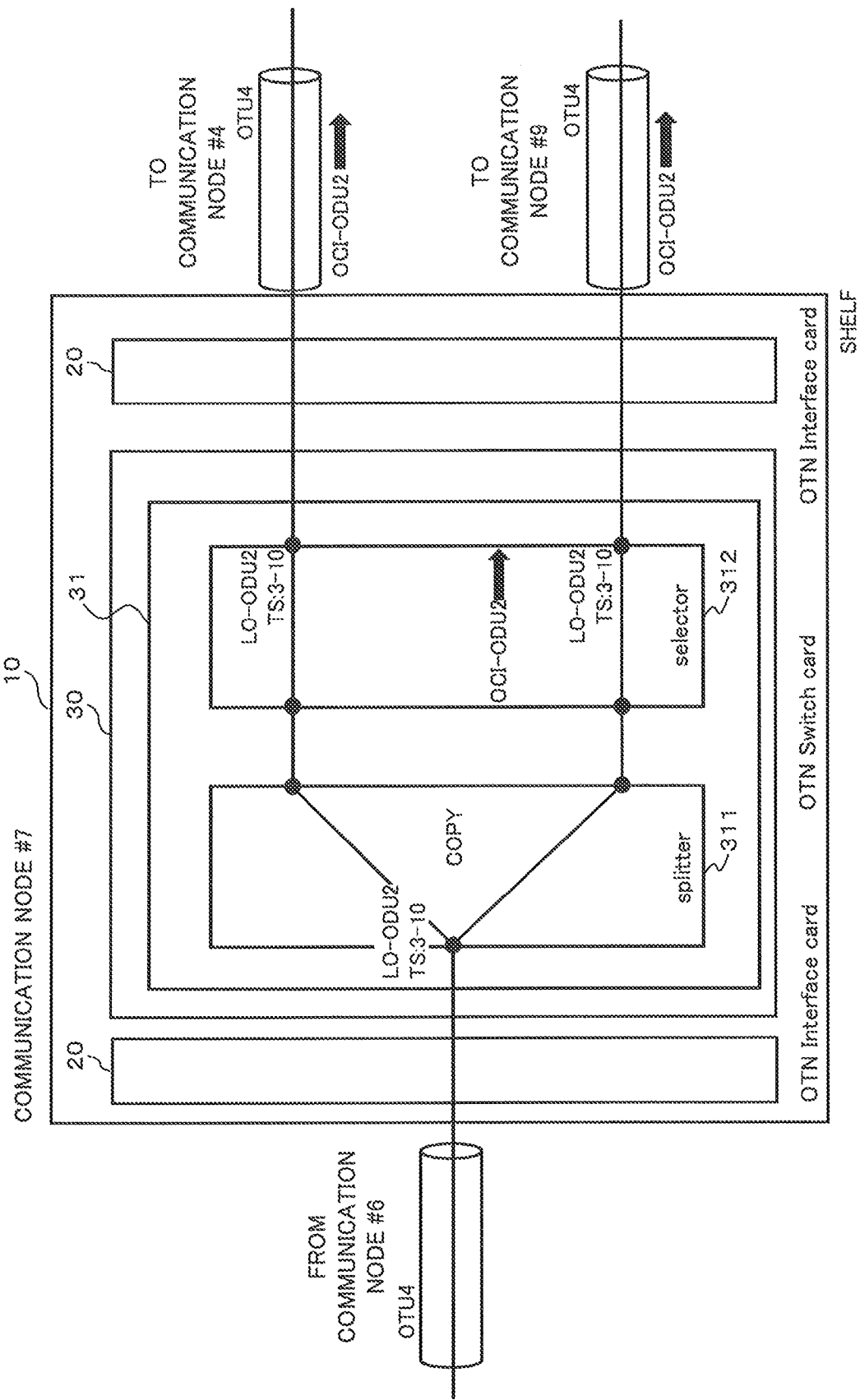
FIG. 8 is a diagram schematically illustrating a cross connect setting in a communication node #7 illustrated in FIG. 1.
Figure 9:
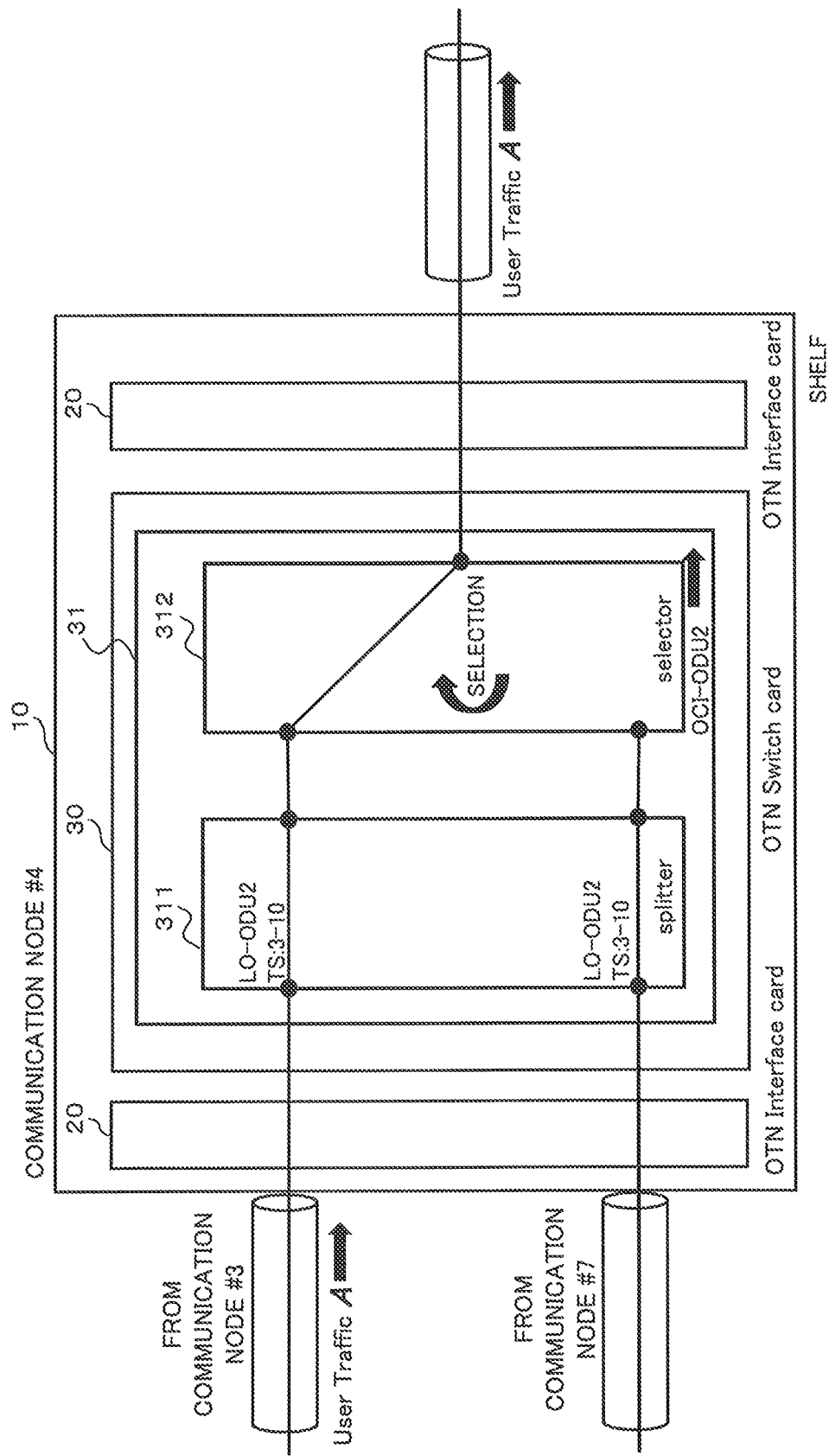
FIG. 9 is a diagram schematically illustrating a cross connect setting in a communication node #4 illustrated in FIG. 1.
Figure 10:
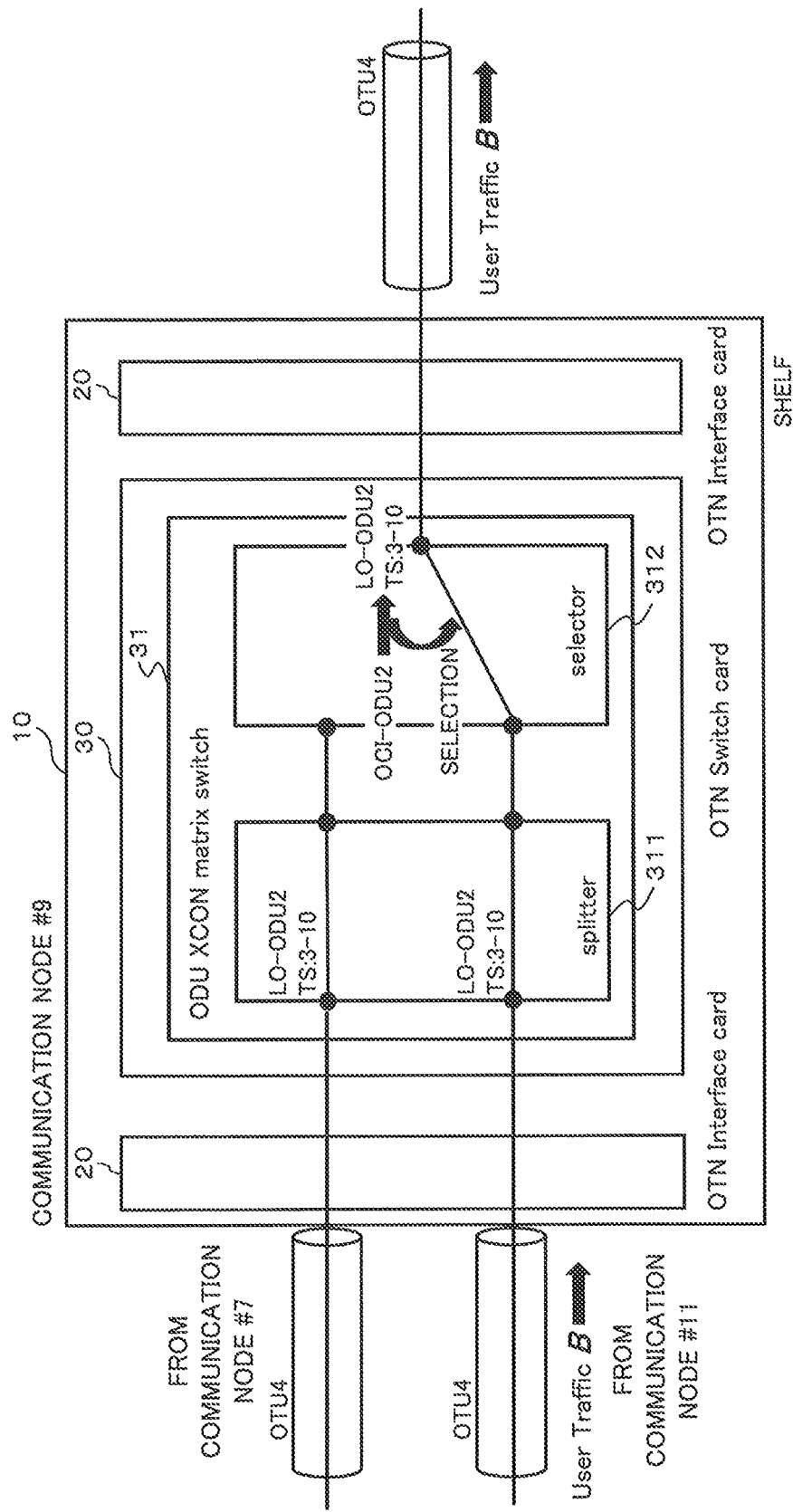
FIG. 10 is a diagram schematically illustrating a cross connect setting in a communication node #9 illustrated in FIG. 1.

As illustrated in FIGS. 5 to 10, the optical switch functioning unit 31 includes a splitter 311 and a selector 312. The splitter 311 splits the received signal into signals inputted to a plurality of input ports of the selector 312, and the selector 312 selects a signal to be output. FIG. 5 schematically illustrates the cross connect setting in the communication node #1 illustrated in FIG. 1, FIG. 6 schematically illustrates the cross connect setting in the communication node #8 illustrated in FIG. 1, and FIG. 7 schematically illustrates the cross connect setting in the communication node #5 illustrated in FIG. 1. Further, FIG. 8 schematically illustrates the cross connect setting in the communication node #7 illustrated in FIG. 1, FIG. 9 schematically illustrates the cross connect setting in the communication node #4 illustrated in FIG. 1, and FIG. 10 schematically illustrates the cross connect setting in the communication node #9 illustrated in FIG. 1.

As illustrated in FIG. 5, the source node #1 of the working path A transfers an ODU2 frame (a user traffic A) mapped in an OTU2 frame received from the upstream side to the working path A. FIG. 5 illustrates an example in which the user traffic A is mapped into, for example, TSs 3-10 of LO-ODU2 the LO-ODU2 is included in an OTU4 frame, and the OTU4 is transferred. Meanwhile, the source node #1 transmits an OCI-ODU2 alarm to the protection path B as described previously.

Similarly, as illustrated in FIG. 6, the source node #8 of the working path B transfers an ODU2 frame (a user traffic B) mapped in the OTU2 frame received from the upstream side to the working path B. Meanwhile, the source node #8 transmits the OCI-ODU2 alarm to the protection path B as described previously.

Further, as illustrated in FIG. 7, the source node #5 of the common path C selects one (for example, the OCI-ODU2 alarm received from the protection path A) of the OCI-ODU2 alarms each of which received through both of the protection paths A and B to transfer the selected OCI-ODU2 alarm to the downstream communication node #6.

Further, as illustrated in FIG. 8, the end node #7 of the common path C copies the OCI-ODU2 alarm received from the upstream communication node #6 and transfers the OCI-ODU2 alarms to the respective end nodes #4 and #9 of the working paths A and B.

Further, as illustrated in FIG. 9, the end node #4 of the working path A selects the user traffic A among the user traffic A received from the upstream communication node #3 and the OCI-ODU2 alarm received from the communication node #7 to thereby transfer the selected user traffic A to the downstream.

Further, as illustrated in FIG. 10, the end node #9 of the working path B selects the user traffic B among the user traffic B received from the upstream communication node #11 and the OCI-ODU2 alarm received from the communication node #7 to thereby transfer the user traffic B to the downstream.

(When Single Failure Occurs)

Figure 11:
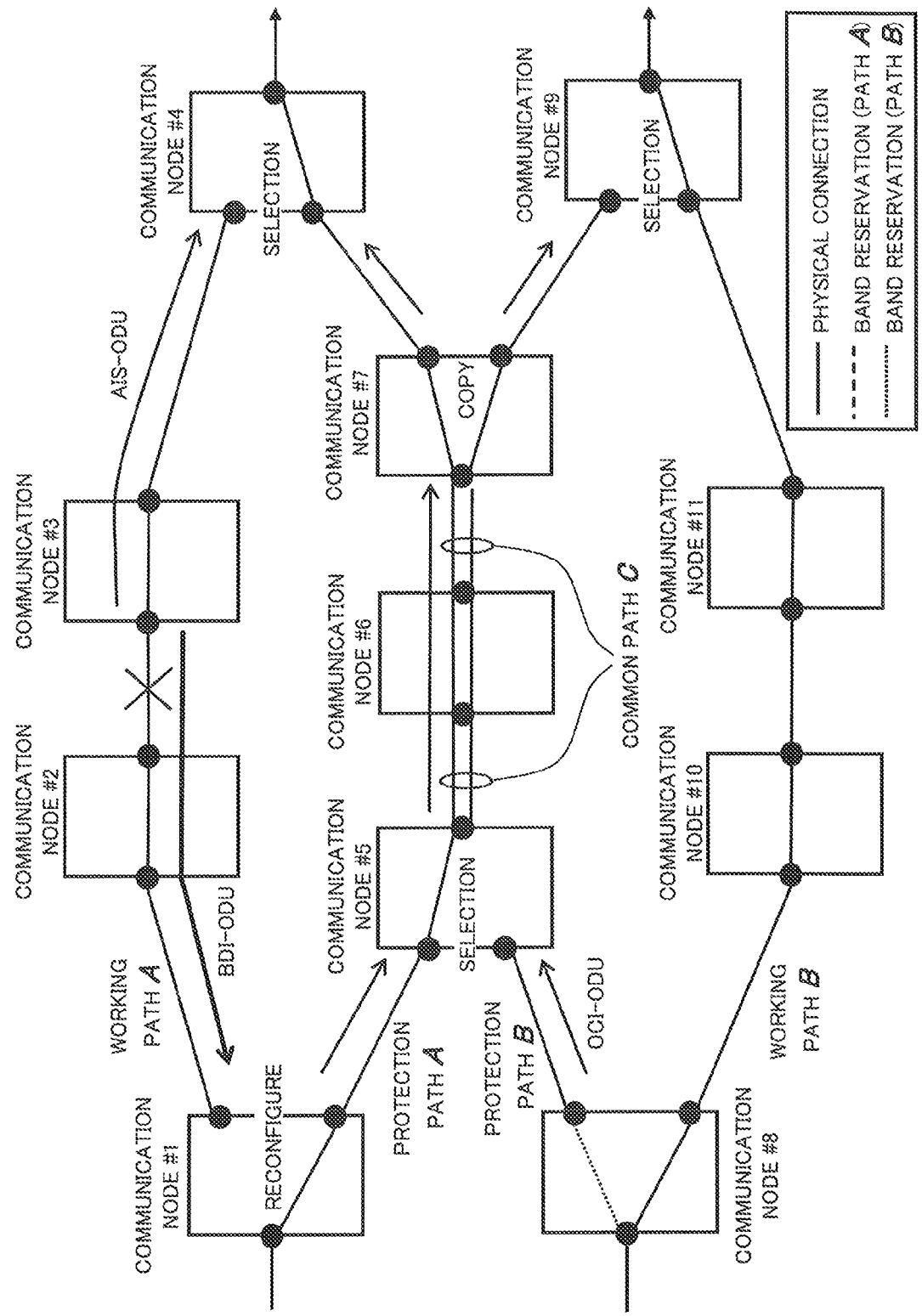
FIG. 11 is a network configuration diagram for describing an example of path switching control when a failure occurs in one of working paths in the network configuration illustrated in FIG. 1 (when a single failure occurs)
Figure 12:
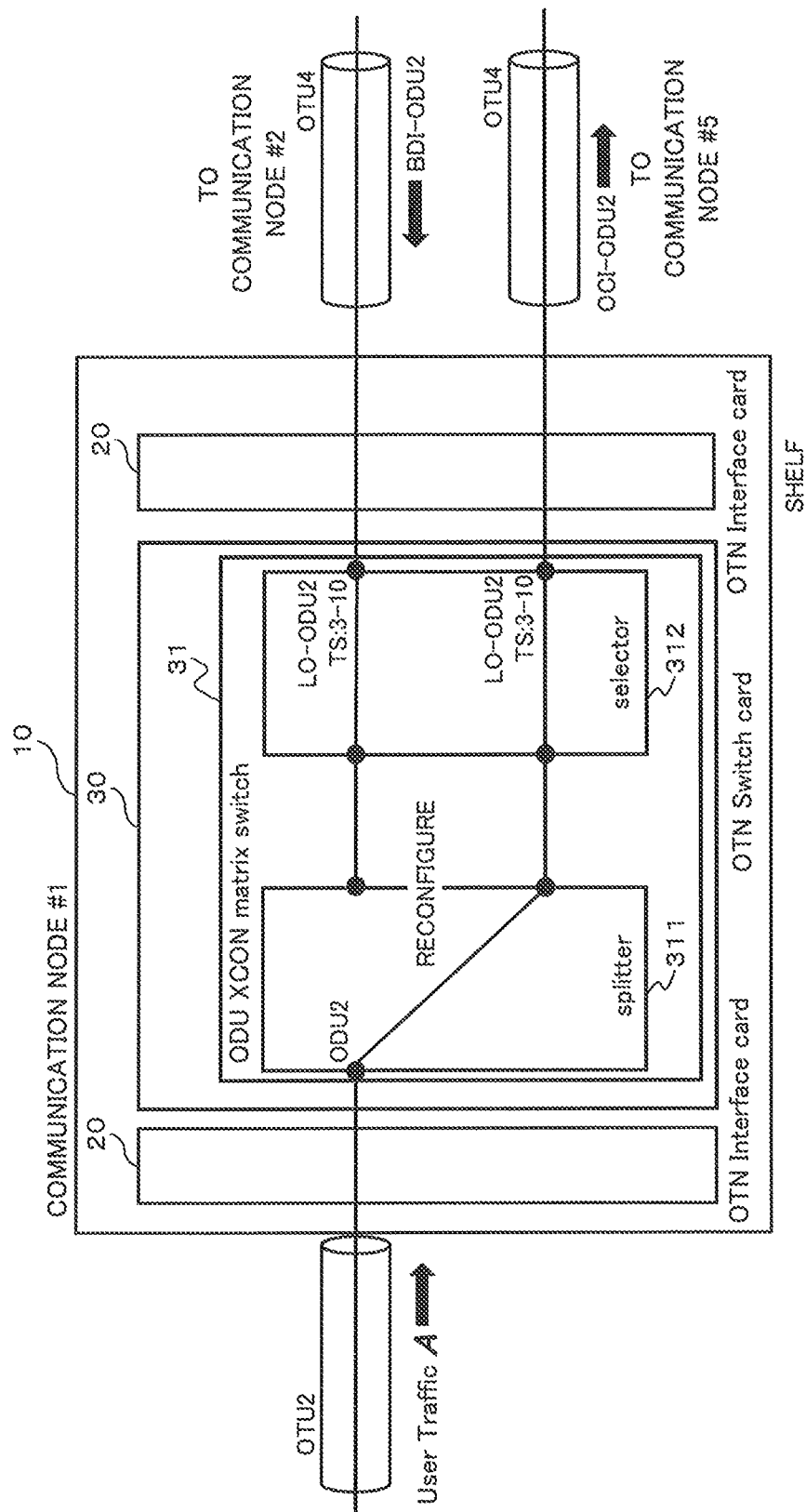
FIG. 12 is a diagram schematically illustrating a cross connect setting in a communication node #1 illustrated in FIG. 11.

Next, the description will proceed with an example of path switching control when a failure occurs in one of the working paths A and B, for example, the working path A (between the communication nodes #2 and #3) in the network configuration and the communication node configuration described above, as illustrated in FIG. 11. FIGS. 12 to 17 schematically illustrate examples of the cross connect setting in the communication nodes #1, #8, #5, #7, #4, and #9, respectively, when the failure occurs.

When the signal transmission failure occurs in the working path A between the communication nodes #2 and #3, the downstream communication node #3 detects the occurrence of the failure because the ODUk frame is not received. The communication node #3 detecting the occurrence of the failure generates the AIS-ODUk alarm and transmits the AIS-ODUk alarm to the downstream communication node #4. Meanwhile, the communication node #3 generates the BDI-ODUk alarm and transmits the BDI-ODUk alarm to the upstream communication node #2. Although not illustrated in FIG. 11, the BDI-ODUk alarm is transmitted to the upstream through an optical transmission line which is paired with a failure occurred optical transmission line and transmits an optical signal in a direction opposite to that of the working path A. A two-way optical transmission line is provided similarly between the other communication nodes #j (the same applies hereinafter).

In response to a reception of the BDI-ODUk alarm from the downstream communication node #3, the communication node #2 further transfers the received BDI-ODUk alarm to the upstream communication node #1.

In the source node #1 of the working path A and the protection path A, the optical transceiver 21 of the OTN interface unit 20 connected to the working path A receives the BDI-ODUk alarm (process P11 of FIG. 18), and the alarm detector 26 detects the BDI-ODUk alarm.

Figure 18:
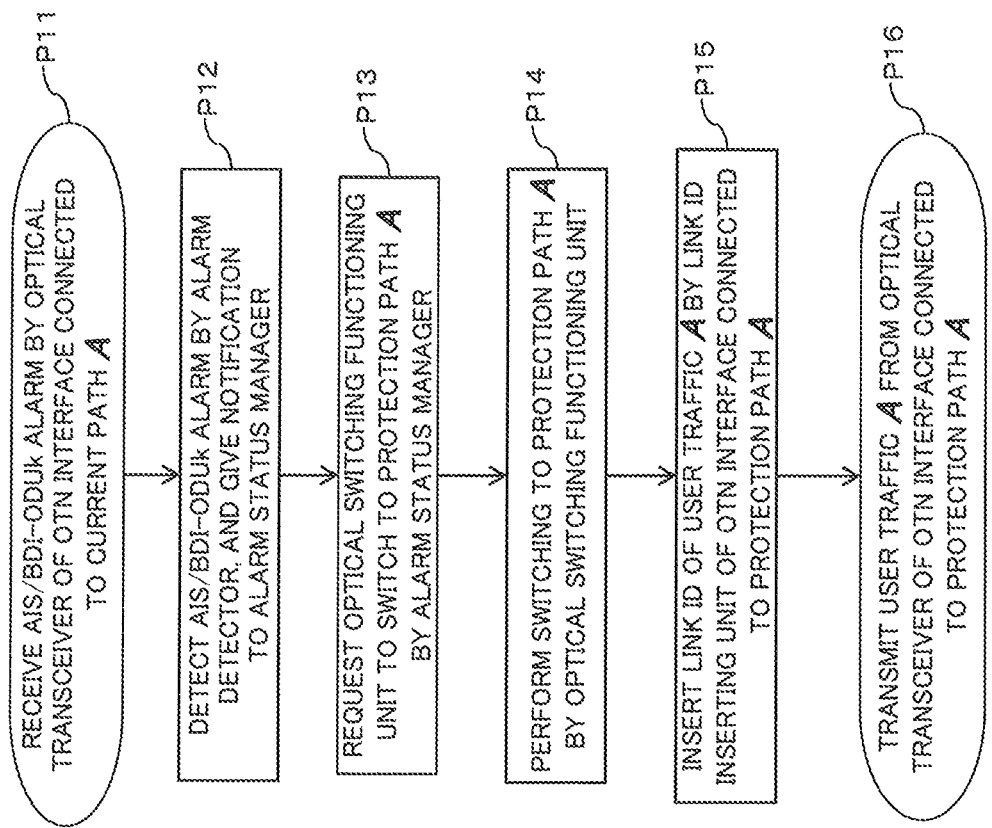
FIG. 18 is a flowchart for describing an exemplary operation of the communication node #1 illustrated in FIG. 11.

The alarm detector 26 notifies the alarm status manager 61 of the detection of the BDI-ODUk alarm (process P12 of FIG. 18). The alarm status manager 61 requests the optical switch functioning unit 31 to perform switching to the protection path A (process P13 of FIG. 18). The optical switch functioning unit 31 performs switching to the protection path A in response to the switching request (process P14 of FIG. 18).

In other words, the communication node #1 releases the physical connection setting (the cross connect setting or the like) on the working path A and performs the physical connection setting on the protection path A. Thereby, the user traffic A is transmitted to the protection path A (see FIG. 12). Here, the source node #1 inserts the link ID (for example, the link A) of the user traffic A into the RES field of the user traffic A by the link ID inserting unit 24 of the OTN interface unit 20 connected to the protection path A (process P15 of FIG. 18).

The ODUk frame of the user traffic A into which the link ID is inserted is transmitted from the optical transceiver 21 of the OTN interface unit 20 connected to the protection path A to the protection path A (process P16 of FIG. 18). Therefore, an ID of the link A is included in the ODUk frame of the user traffic A transmitted from the source node #1 to the protection path A.

Figure 13:
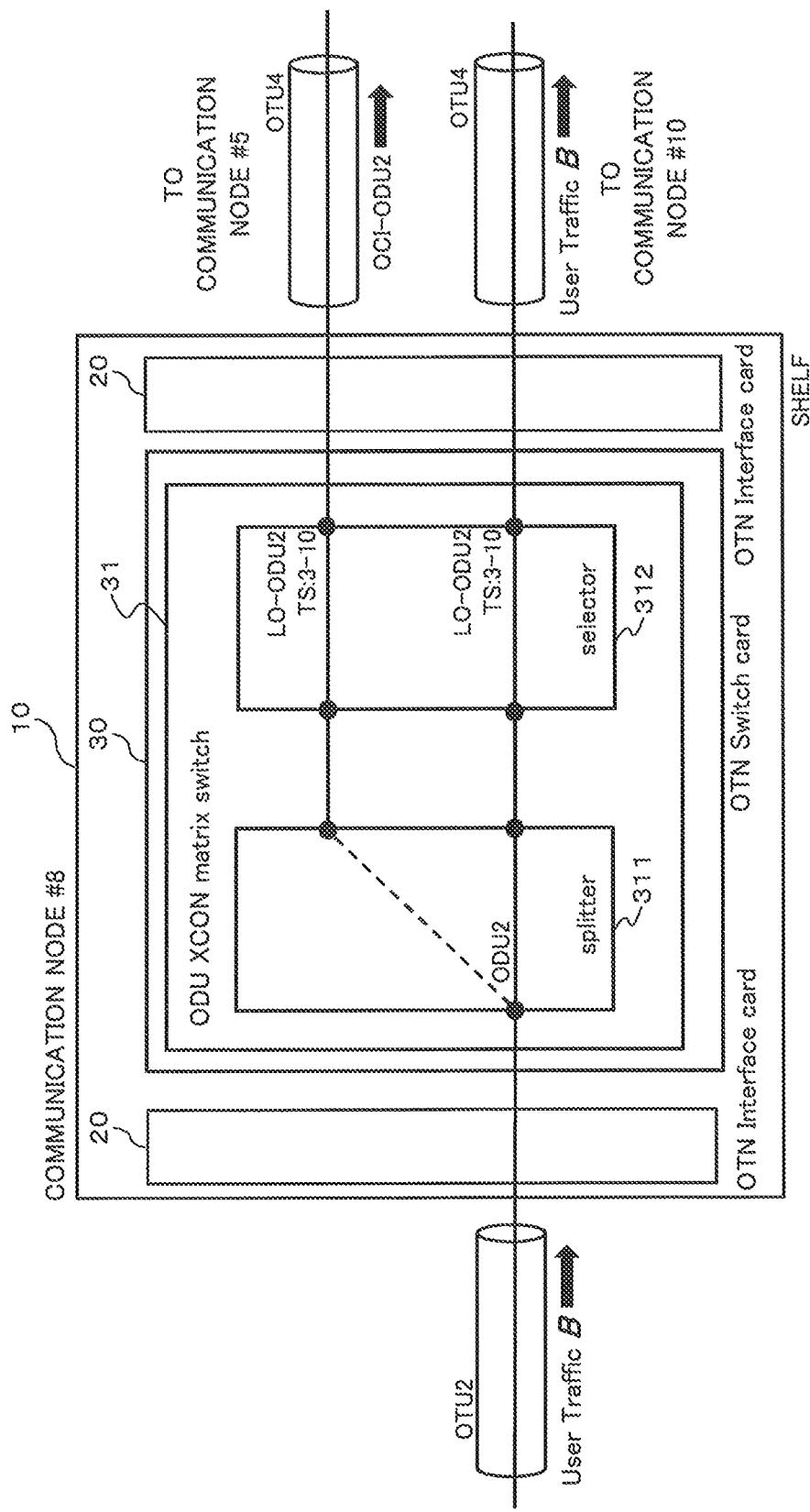
FIG. 13 is a diagram schematically illustrating a cross connect setting in a communication node #8 illustrated in FIG. 11.
Figure 14:
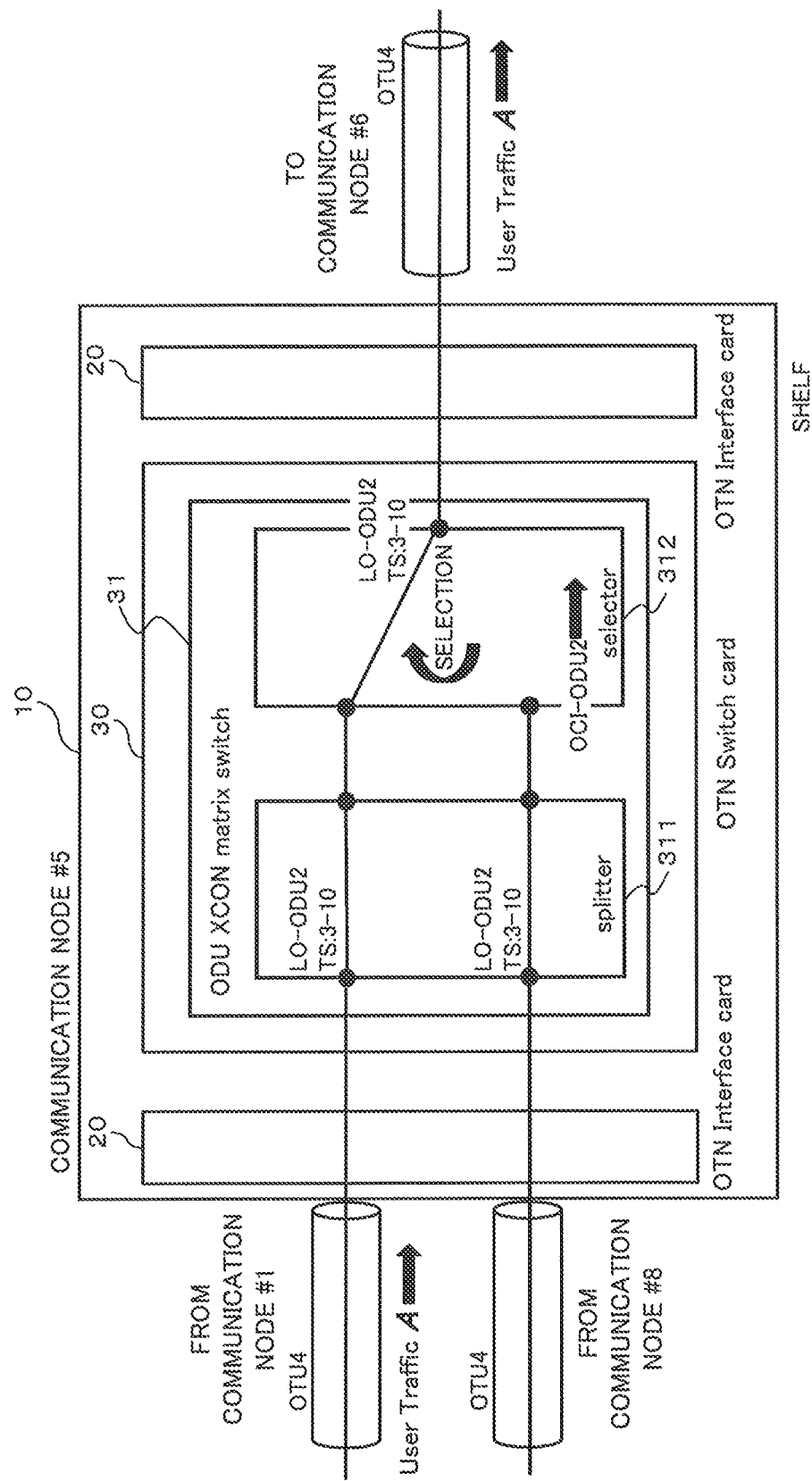
FIG. 14 is a diagram schematically illustrating a cross connect setting in a communication node #5 illustrated in FIG. 11.

Meanwhile, the source node #8 of the working path B and the protection path B transmits the OCI-ODUk alarm to the protection path B while maintaining the physical connection setting on the working path B (see FIG. 13). Here, an ID of a link B is inserted by the link ID inserting unit 24 into the ODUk frame of the traffic transmitted from the communication node #8 to the working path B.

The source node #5 of the common path C becomes unavailable to receive the OCI-ODUk alarm through the protection path A (cancellation of alarm). Instead, the communication node #5 receives the user traffic A through the optical transceiver 21 of the OTN interface unit 20 connected to the protection path A (process P21 of FIG. 19). Meanwhile, the communication node #5 receives the OCI-ODUk alarm through the optical transceiver 21 of the OTN interface unit 20 connected to the protection path B.

Figure 19:
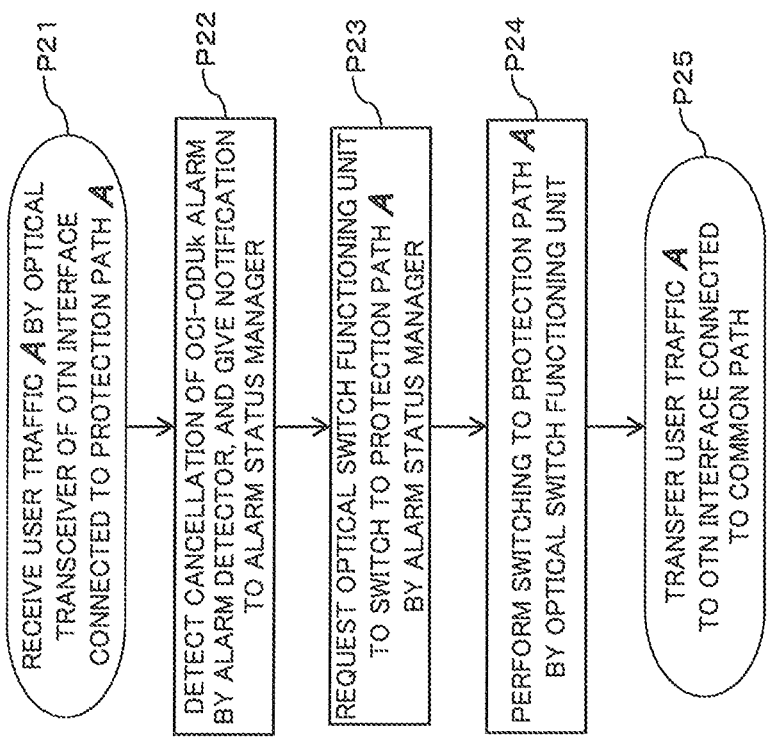
FIG. 19 is a flowchart for describing an exemplary operation of the communication node #5 illustrated in FIG. 11.

Thus, the alarm detector 26 detects the cancellation of the OCI-ODUk alarm on the protection path A, and the alarm detector 26 notifies the alarm status manager 61 of the cancellation of the OCI-ODUk alarm on the protection path A (process P22 of FIG. 19). The alarm status manager 61 that has been notified of the cancellation of the OCI-ODUk alarm requests the optical switch functioning unit 31 to perform switching to the protection path A (process P23 of FIG. 19).

The optical switch functioning unit 31 performs switching to the protection path A in response to the switching request (process P24 of FIG. 19). As described above, in response to the cancellation of the OCI-ODUk alarm of the protection path A, the communication node #5 selects by using the selector 312 the user traffic A received through the protection path A to be transferred (see FIG. 14). Thereby, the user traffic A is transmitted from the OTN interface unit 20 connected to the common path C to the common path C (process P25 of FIG. 19). As a result, the user traffic A is transferred through the common path C in the order of the communication nodes #6 and #7.

Figure 15:
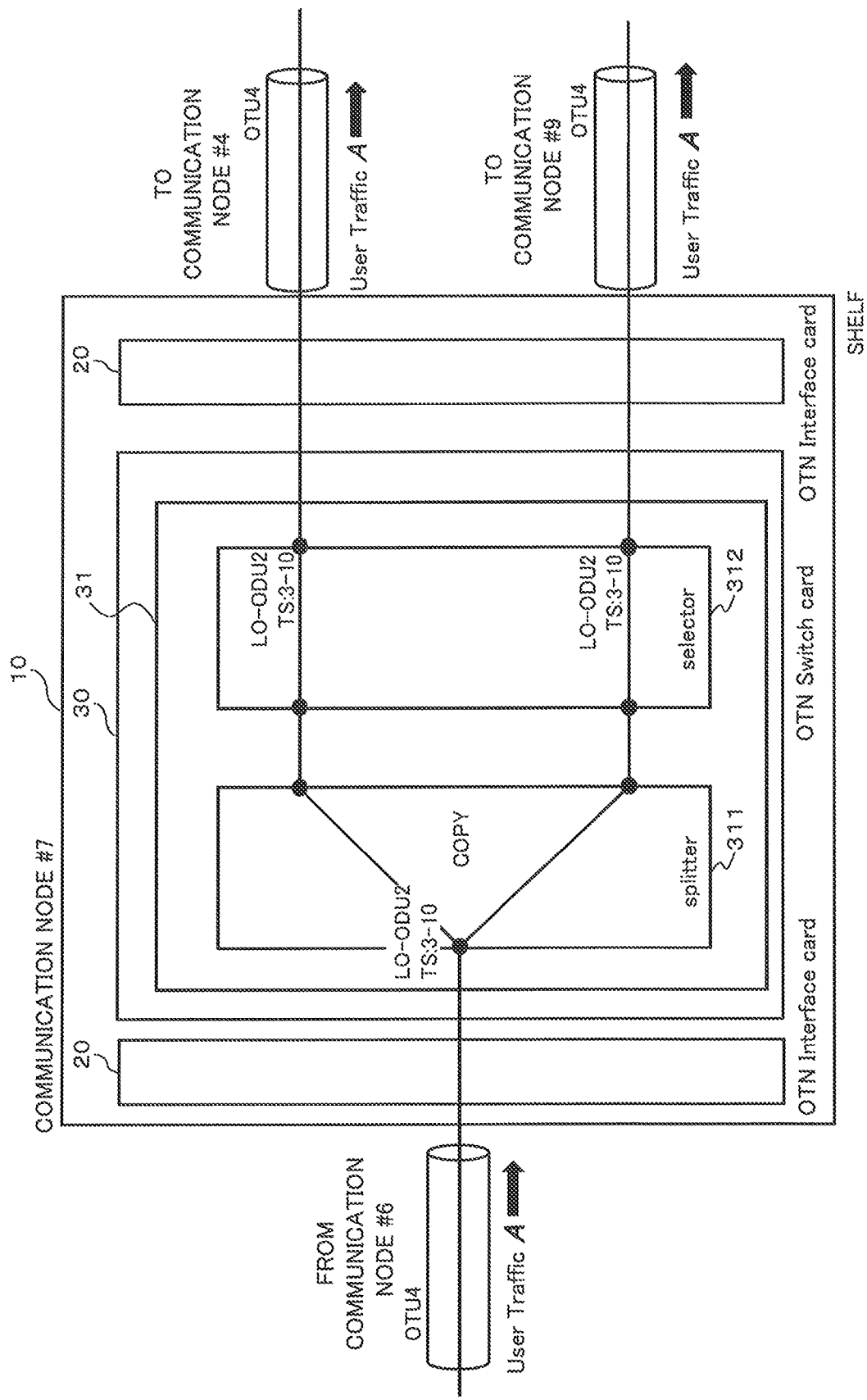
FIG. 15 is a diagram schematically illustrating a cross connect setting in a communication node #7 illustrated in FIG. 11.
Figure 16:
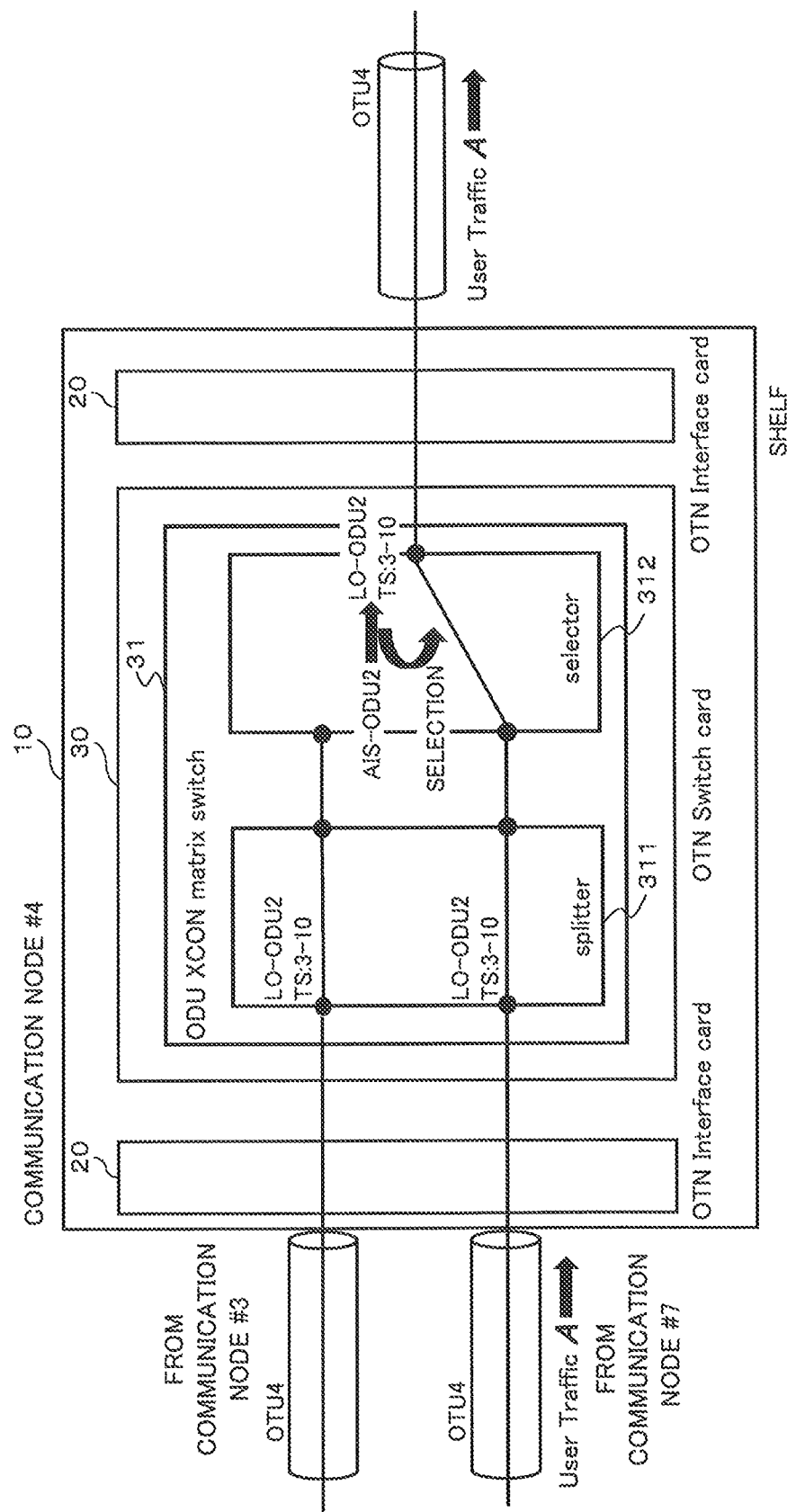
FIG. 16 is a diagram schematically illustrating a cross connect setting in a communication node #4 illustrated in FIG. 11.
Figure 17:
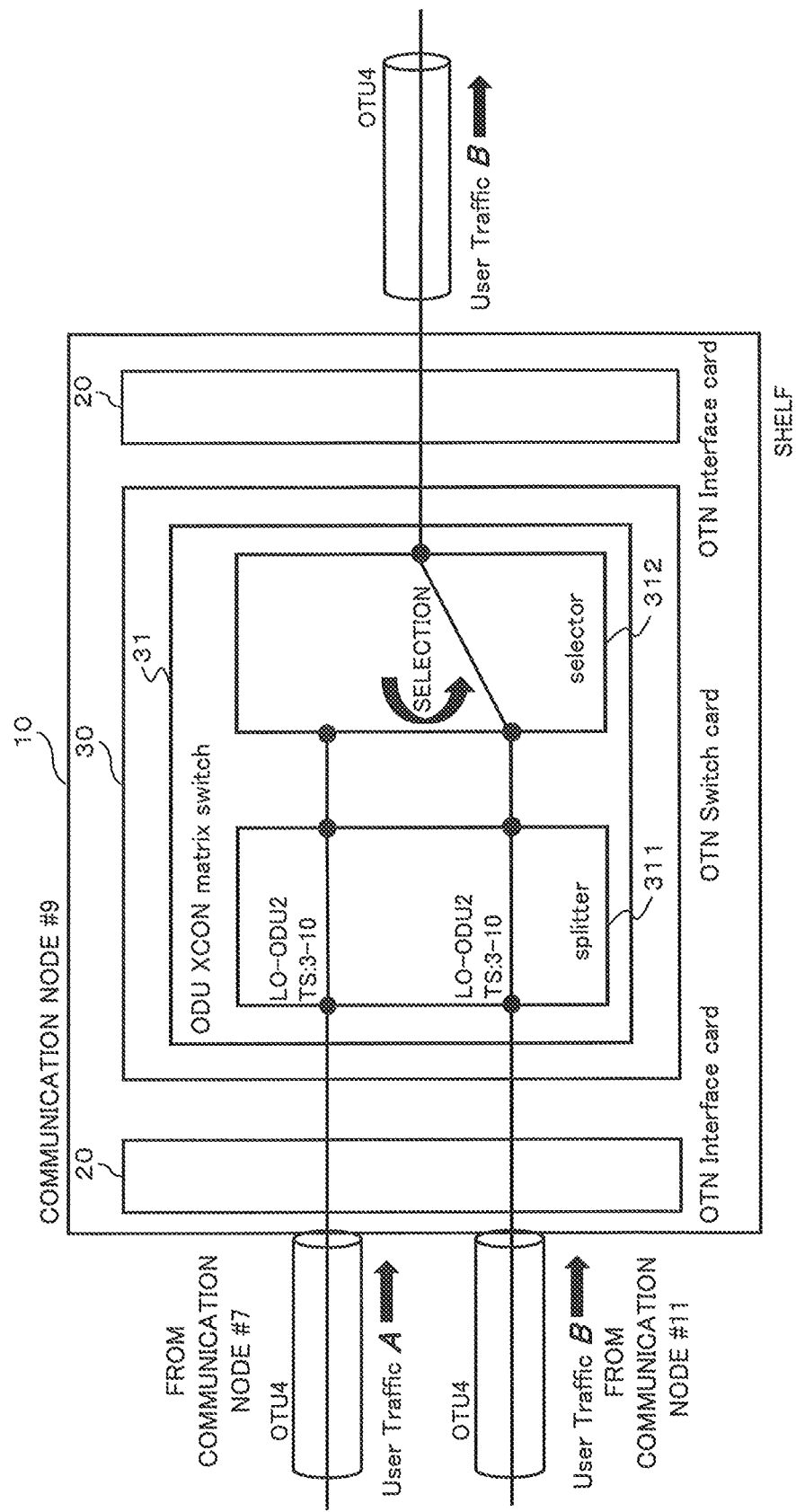
FIG. 17 is a diagram schematically illustrating a cross connect setting in a communication node #9 illustrated in FIG. 11.

The end node #7 of the common path C copies the user traffic A received from the communication node #6 using the splitter 311 and transmits the user traffic A to both of the end nodes #4 and #9 of the working paths A and B (see FIG. 15).

The end node #4 of the working path A receives the AIS-ODUk alarm from the communication node #3 through the working path A. Meanwhile, the end node #4 receives the user traffic A including the link ID of the link A from the protection path A (the common path C) through the optical transceiver 21 of the OTN interface unit 20 connected with the communication node #7 (process P31 of FIG. 20).

Figure 20:
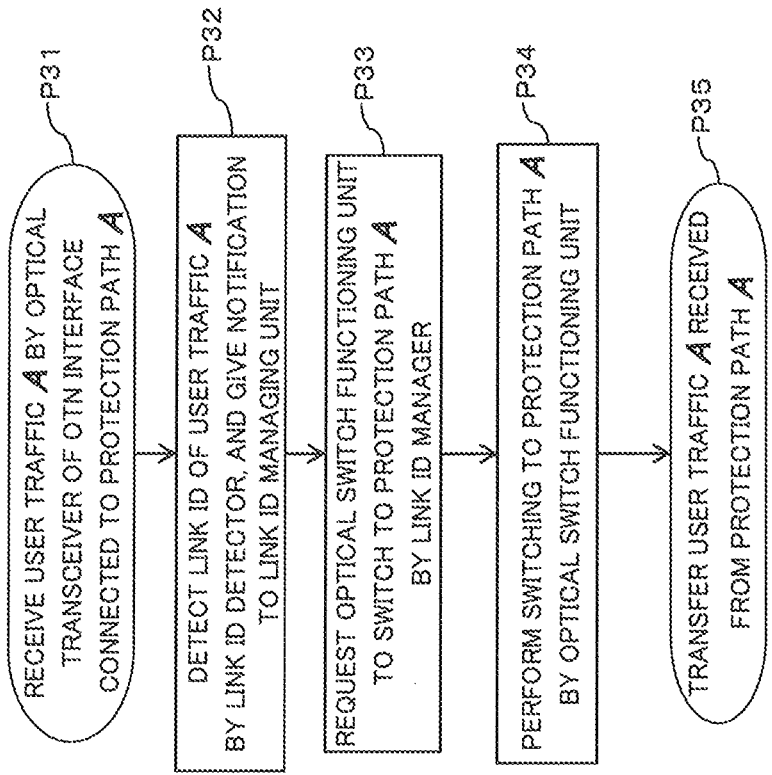
FIG. 20 is a flowchart for describing an exemplary operation of the communication node #4 illustrated in FIG. 11.

The received user traffic A is transferred to the link ID detector 27, and the link ID detector 27 detects the link ID (the link A) of the user traffic A and notifies the link ID manager 62 of the detected link ID (process P32 of FIG. 20).

The link ID manager 62 determines that the received user traffic A is allowed to transfer because the notified link ID is the link A. Thus, the link ID manager 62 transmits the switching request to the optical switch functioning unit 31 to transfer the user traffic A received from the communication node #7 (process P33 of FIG. 20). Thereby, the optical switch functioning unit 31 is switched to select the user traffic A to be transferred (process P34 of FIG. 20), and the user traffic A received from the communication node #7 is transferred to the downstream (process P35 of FIG. 20 and see FIG. 16).

Meanwhile, the end node #9 of the working path B receives the user traffic B including the link ID of the link B from the communication node #11 through the working path B. The end node #9 also receives the user traffic A including the link ID of the link A from the protection path B (the common path C) through the optical transceiver 21 of the OTN interface unit 20 connected with the communication node #7 (process P41 of FIG. 21).

Figure 21:
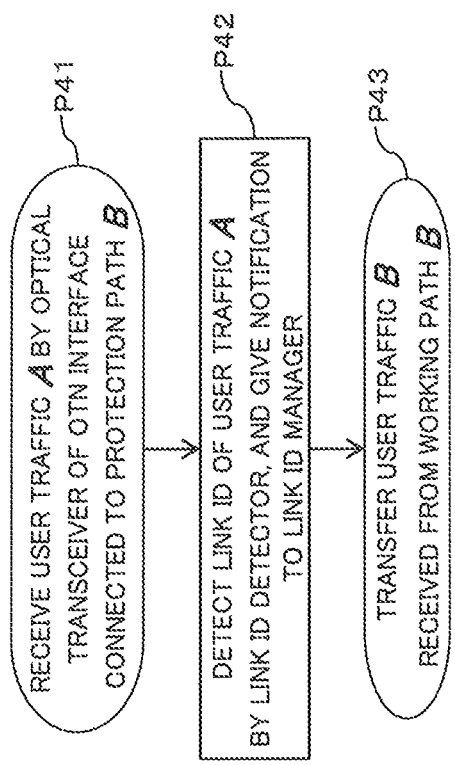
FIG. 21 is a flowchart for describing an exemplary operation of the communication node #9 illustrated in FIG. 11.

The received user traffic A is transferred to the link ID detector 27, and the link ID detector 27 detects the link ID (the link A) of the user traffic A and notifies the link ID manager 62 of the detected link ID (process P42 of FIG. 21).

The link ID manager 62 determines whether the received user traffic is allowed to transfer based on the notified link ID. In this case, the link ID manager 62 determines that the user traffic B including the link ID of the link B is allowed to transfer. Thus, the link ID manager 62 transmits the switching request to the optical switch functioning unit 31 to transfer the user traffic B. Thereby, the communication node #9 selects by using the selector 312 the user traffic B received through the working path B to be transferred (process P43 of FIG. 21 and see FIG. 17).

As described above, even when the signal transmission failure occurs in the working path A, since the user traffic A and the user traffic B are normally transmitted through the protection path A and the working path B, respectively, the failure of the working path A is restored by the protection path A.

Further, when the signal transmission failure occurred in the working path B, in a manner similar to the above-described example, the user traffic A and the user traffic B can be normally transmitted through the working path A and the protection path B, respectively.

In other words, in response to a reception of the BDI-ODUk alarm from the downstream communication node #10, the source node #8 of the working path B cancels the transmission of the OCI-ODUk alarm to the protection path B (the communication node #5) and switches the transmission destination of the user traffic B to the protection path B. The user traffic B includes the link ID of the link B.

Since the communication node #5 receives the OCI-ODUk alarm from the protection path A and receives the user traffic B from the protection path B, the communication node #5 selects the user traffic B received from the protection path B to be transferred. Thereby, the user traffic B is transferred to the communication node #7 through the communication node #6.

The communication node #7 copies the user traffic B received from the upstream communication node #6 and transfers the user traffic B to the respective downstream communication nodes #4 and #9.

The communication node #4 serving as the end node of the working path A receives the user traffic A including the link ID of the link A from the working path A (from the communication node #3) and receives the user traffic including the link ID of the link B from the protection path A (from the end node #7 of the common path C). The communication node #4 determines that the user traffic A including the link ID of the link A is a user traffic allowed to transfer to thereby select the user traffic A to be transferred.

The communication node #9 serving as the end node of the working path B receives the AIS-ODUk alarm from the working path B and receives the user traffic B including the link ID of the link B from the protection path B (from the end node #7 of the common path C). The communication node #9 selects the user traffic including the link ID of the link B to be transferred.

Thereby, even when the signal transmission failure occurs in the working path B, since the user traffic B and the user traffic A are normally transmitted through the protection path B and the working path A, respectively, the failure of the working path B is restored by the protection path B.

(When Multiple Failures Occur)

Figure 22:
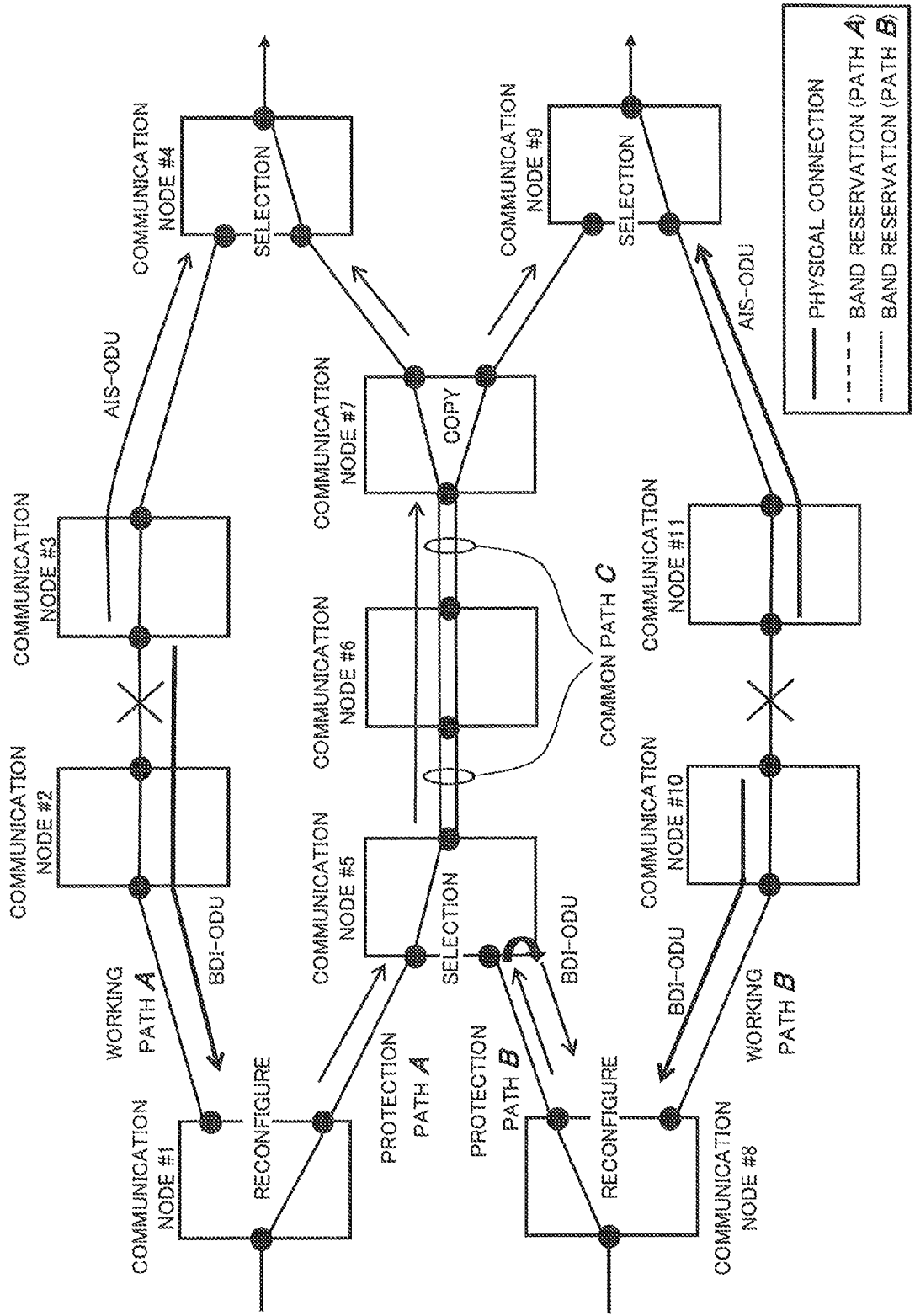
FIG. 22 is a network configuration diagram for describing an example of path switching control when a failure occurs in each of a plurality of working paths in the exemplary network configuration illustrated in FIG. 1 (when multiple failures occur)
Figure 23:
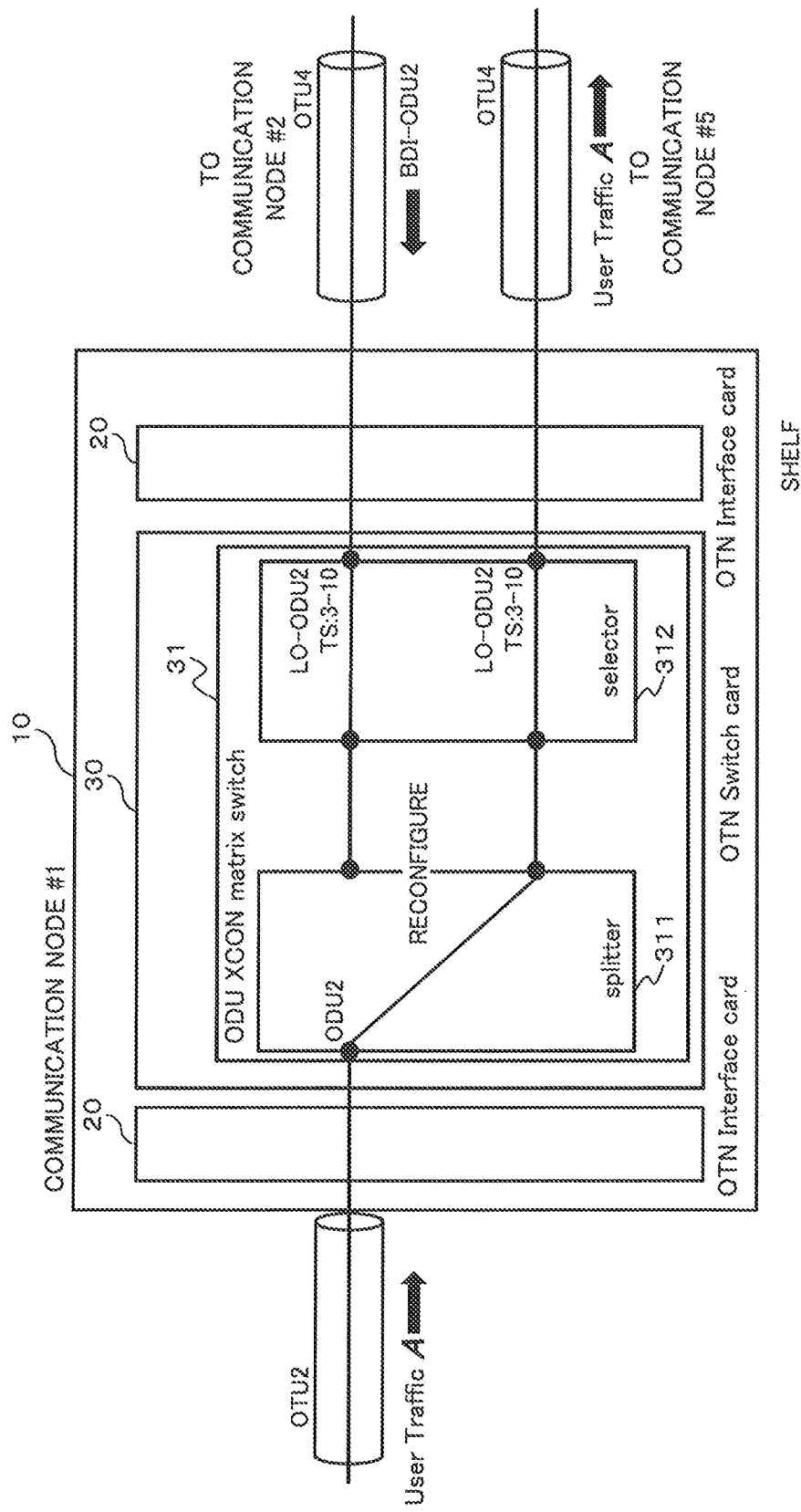
FIG. 23 is a diagram schematically illustrating a cross connect setting in a communication node #1 illustrated in FIG. 22.
Figure 24:
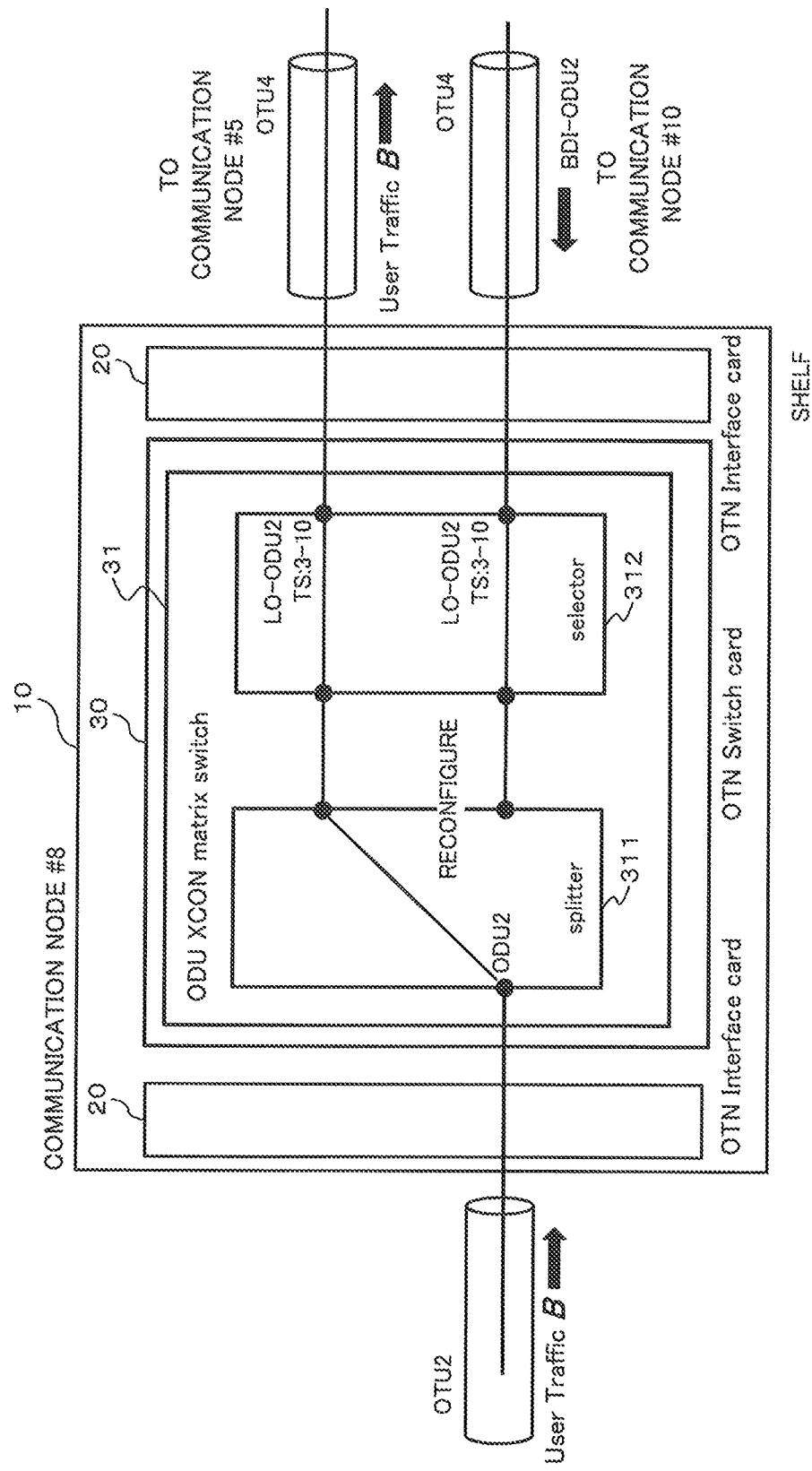
FIG. 24 is a diagram schematically illustrating a cross connect setting in a communication node #8 illustrated in FIG. 22.

Next, an example of path switching control when a signal transmission failure occurs in both of the working paths A and B as illustrated in FIG. 22 will be described. FIGS. 23 to 28 schematically illustrate cross connect setting examples in the communication node #1, #8, #5, #7, #4, and #9, respectively, when the multiple failures occur.

As described previously, when a signal transmission failure occurs in the working path A between the communication nodes #2 and #3, the occurrence of the failure is detected since the ODUk frame is not received in the downstream communication node #3. The communication node #3 detecting the failure generates the AIS-ODUk alarm and transmits the AIS-ODUk alarm to the downstream communication node #4. Meanwhile, the communication node #3 generates the BDI-ODUk alarm and transmits the BDI-ODUk alarm to the upstream communication node #2.

Similarly, when a signal transmission failure occurs in the working path B between the communication nodes #10 and #11, the occurrence of the failure is detected since the ODUk frame is not received in the downstream communication node #11. The communication node #11 detecting the failure generates the AIS-ODUk alarm and transmits the AIS-ODUk alarm to the downstream communication node #9. Meanwhile, the communication node #11 generates the BDI-ODUk alarm and transmits the BDI-ODUk alarm to the upstream communication node #10.

The BDI-ODUk alarm on the working path A is transferred to the communication node #1 through the communication node #2, and the BDI-ODUk alarm on the working path B is transferred to the communication node #8 through the communication node #10.

Upon detecting a reception of the BDI-ODUk alarm through the working path A, the communication node #1 serving as the source node of the working path A and the protection path A releases the physical connection setting (the cross connect setting or the like) on the working path A. Then, the source node #1 performs the physical connection setting on the protection path A and transmits the user traffic A to the protection path A (see FIG. 23). Here, the ODUk frame of the user traffic A transmitted from the source node #1 to the protection path A includes, for example, an ID of the link A.

Meanwhile, upon detecting a reception of the BDI-ODUk alarm through the working path B, the communication node #8 serving as the source node of the working path B and the protection path B releases the physical connection setting (the cross connect setting or the like) on the working path B. Then, the source node #8 performs the physical connection setting on the protection path B and transmits the user traffic B to the protection path B (see FIG. 24). Here, the ODUk frame of the user traffic B transmitted from the source node #8 to the protection path B includes, for example, an ID of the link B.

In the communication node #5 serving as the source node of the common path C shared by the protection path A and the protection path B, the OCI-ODUk alarm is not received from any of the protection path A and the protection path B (the alarm signal has been cancelled). Instead, the communication node #5 receives the user traffics A and B through the optical transceiver 21 of the OTN interface unit 20 connected to the protection paths A and B (processes P51 and P52 of FIG. 29).

Figure 29:
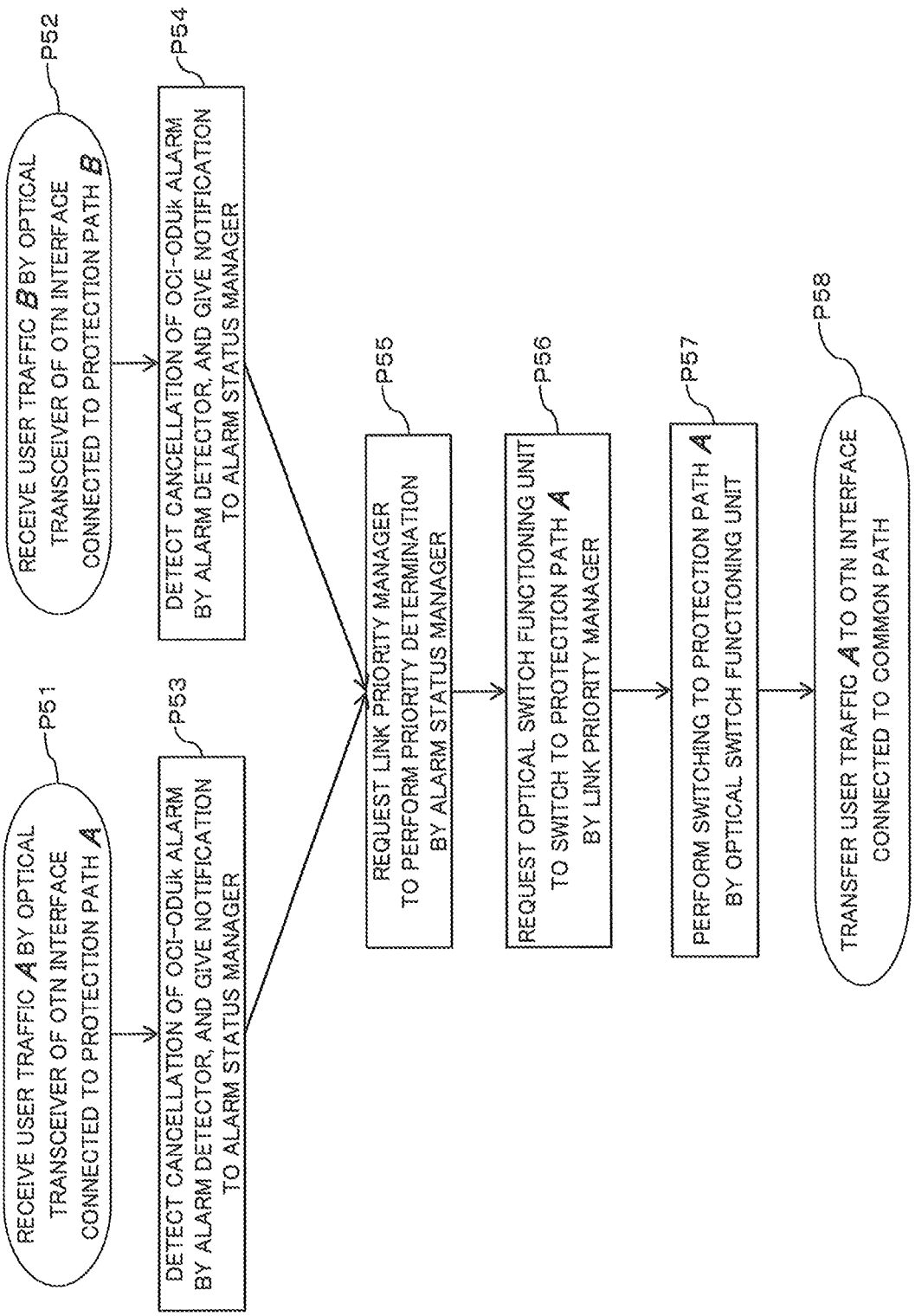
FIG. 29 is a flowchart for describing an exemplary operation of the communication node #5 illustrated in FIG. 22.

Thus, the alarm detector 26 detects the cancellation of the OCI-ODUk alarm and notifies the alarm status manager 61 of the cancellation (processes P53 and P54 of FIG. 29). In response to a reception of the cancellation notification of the OCI-ODUk alarm, the alarm status manager 61 requests the link priority manager 63 to perform a link priority determination (process P55 of FIG. 29).

The link priority manager 63 selects a path (user traffic) to be transferred according to a priority of the protection paths A and B. For example, when the protection path A is higher in priority than the protection path B, the link priority manager 63 transmits the switching request to the optical switch functioning unit 31 to select the signal from the protection path A to be transferred (the user traffic A) (process P56 of FIG. 29).

Figure 25:
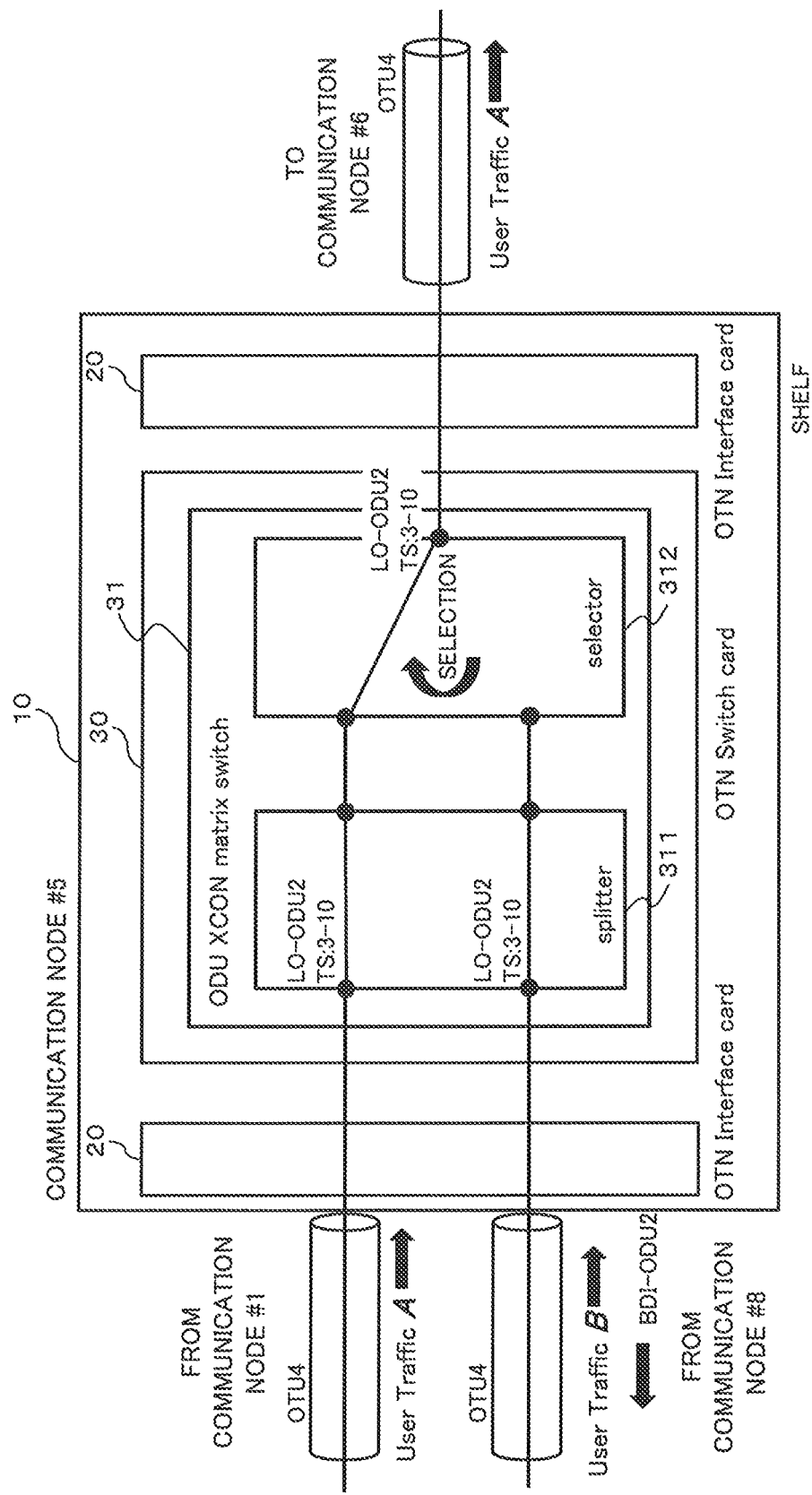
FIG. 25 is a diagram schematically illustrating a cross connect setting in a communication node #5 illustrated in FIG. 22.

The optical switch functioning unit 31 performs switching so that the user traffic A received through the protection path A is transferred according to the switching request (process P57 of FIG. 29 and see FIG. 25). Thereby, the user traffic A is transferred to the communication node #6 through the OTN interface unit 20 connected to the common path C (process P58 of FIG. 29).

Meanwhile, the communication node #5 generates the BDI-ODUk alarm and transmits the BDI-ODUk alarm to the communication node #8 serving as the source node of the working path B (see FIG. 22). Thereby, the communication node #8 serving as the source node of the working path B can recognize that a connection (a restoration) to the protection path B for the working path A has been failed.

Figure 26:
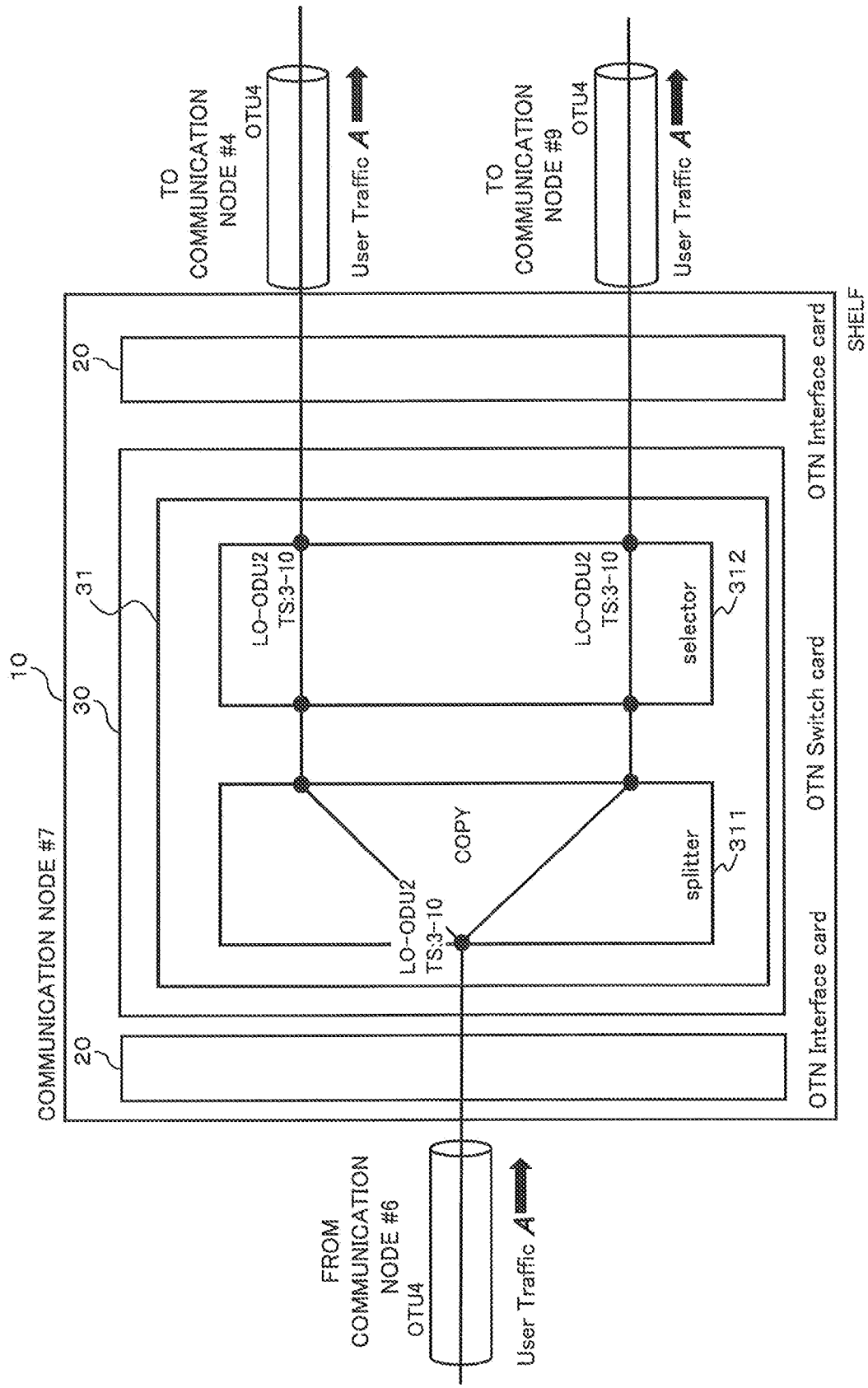
FIG. 26 is a diagram schematically illustrating a cross connect setting in a communication node #7 illustrated in FIG. 22.
Figure 27:
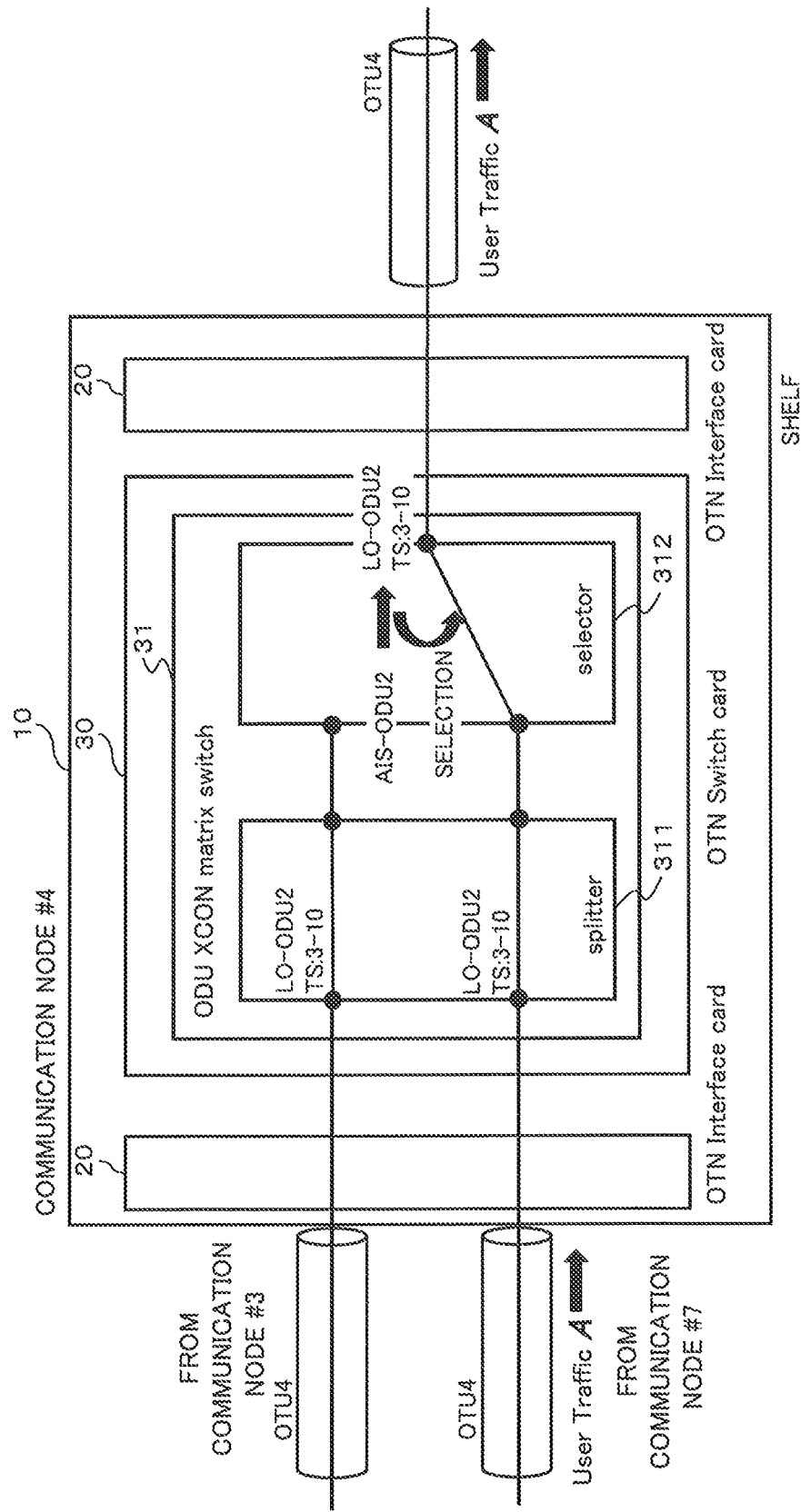
FIG. 27 is a diagram schematically illustrating a cross connect setting in a communication node #4 illustrated in FIG. 22.
Figure 28:
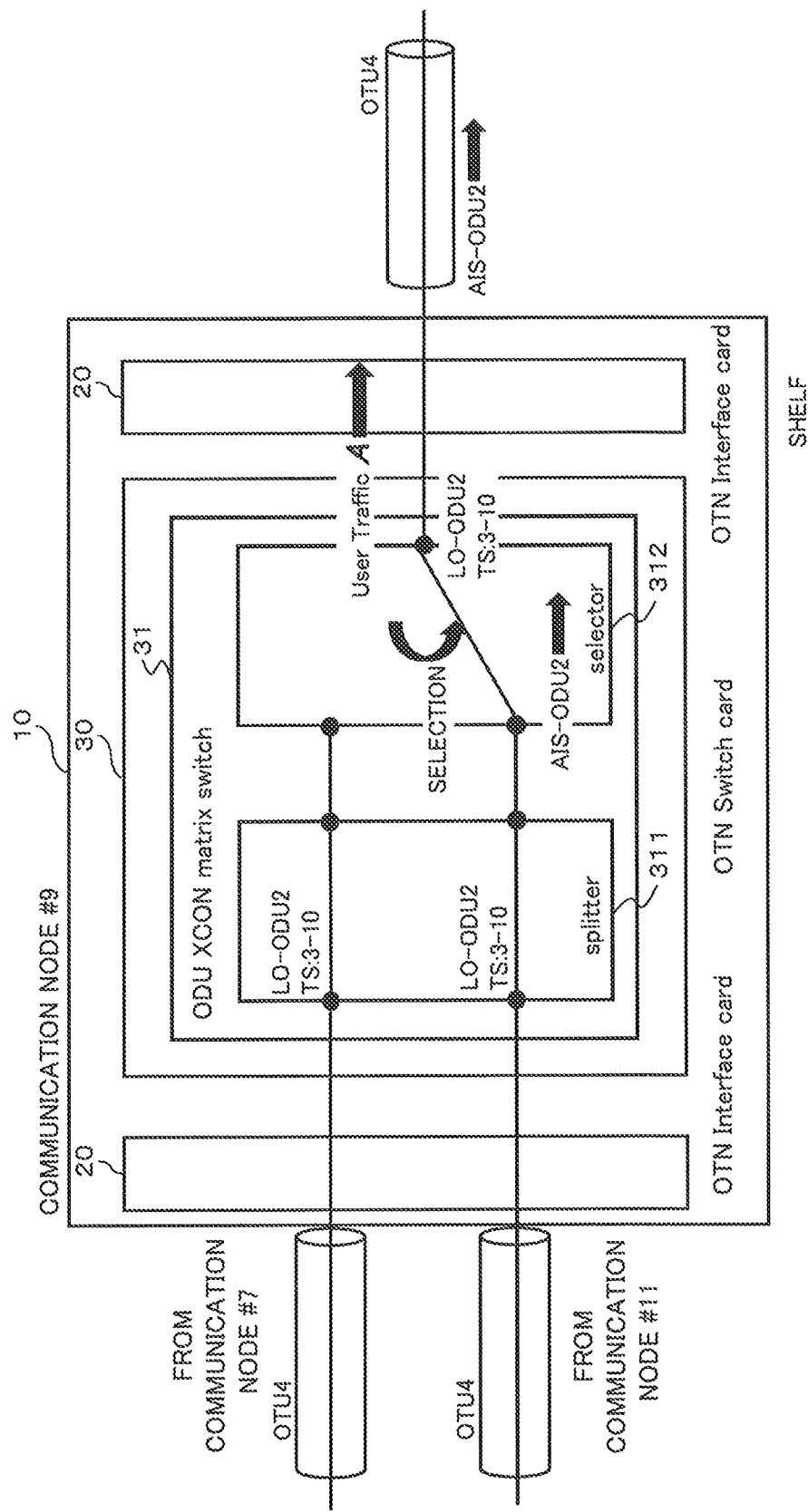
FIG. 28 is a diagram schematically illustrating a cross connect setting in a communication node #9 illustrated in FIG. 22.

The end node #7 of the common path C copies the user traffic A received from the communication node #6 using the splitter 311 and transmits the user traffic A to the respective communication nodes #4 and #9 serving as the end node of the working paths A and B (see FIG. 26).

The end node #4 of the working path A receives the AIS-ODUk alarm from the working path A and receives the user traffic A including the link ID of the link A in the ODUk frame from the protection path A (from the end node #7 of the common path C). Thus, the communication node #4 selects the user traffic A to be transferred, which is received from the communication node #7 by using the selector 312 (see FIG. 27).

The communication node #9 serving as the end node of the working path B receives the AIS-ODUk alarm from the working path B and receives the user traffic A including the link ID of the link A in ODUk frame from the protection path B (from the end node #7 of the common path C). Since the link ID does not indicate the user traffic allowed to transfer, the communication node #9 selects the AIS-ODUk alarm to be transferred, which is received from the working path B (see FIG. 28).

As described above, even when the signal transmission failure occurs in both of the working paths A and B, at least one of user traffics can be restored according to the priority of the protection paths A and B.

(When Failure is Restored)

Figure 30:
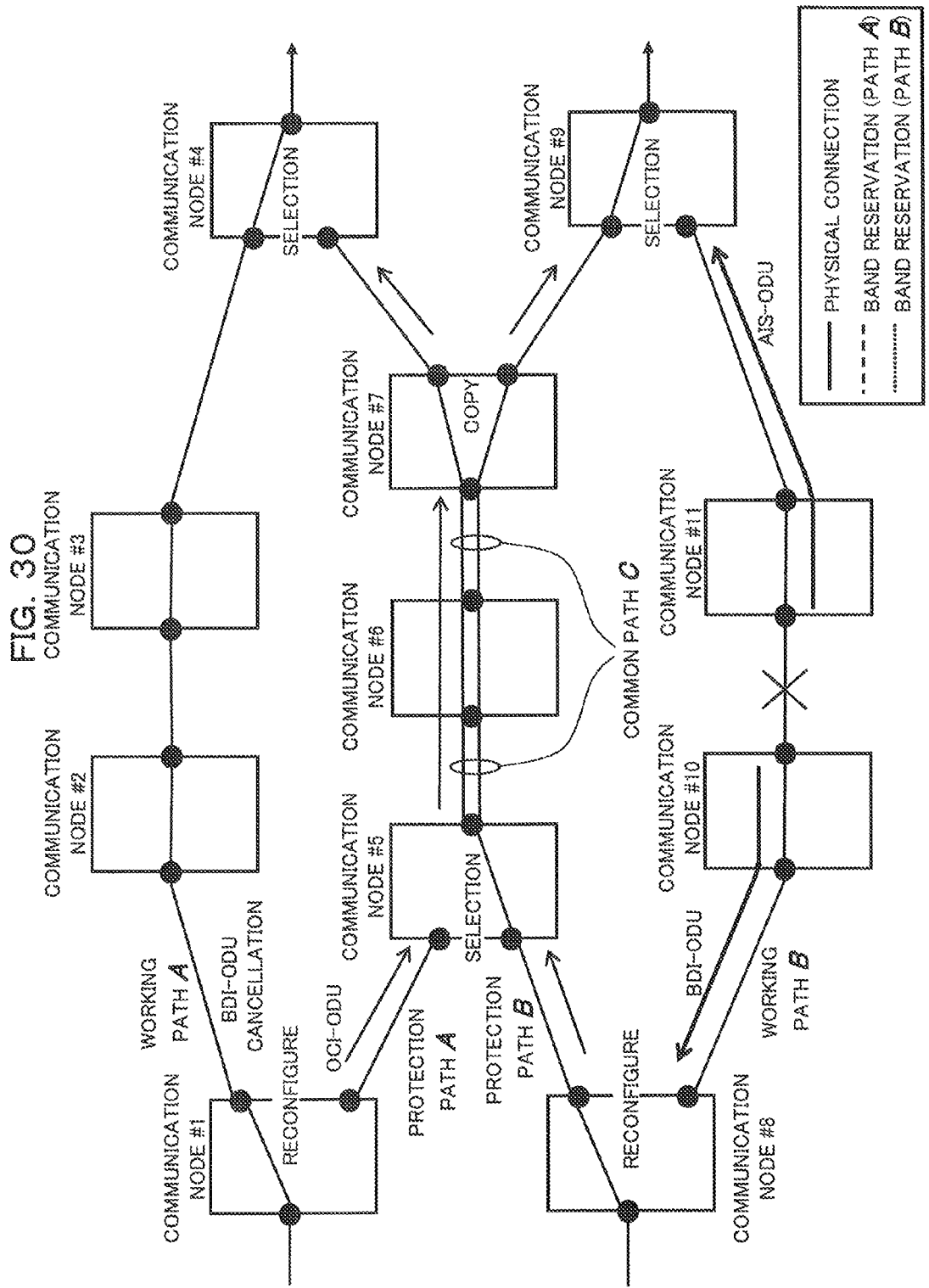
FIG. 30 is a network configuration diagram for describing an example of path switching control when a failure of one working path is restored (or recovered) in the network configuration illustrated in FIG. 22.
Figure 31:
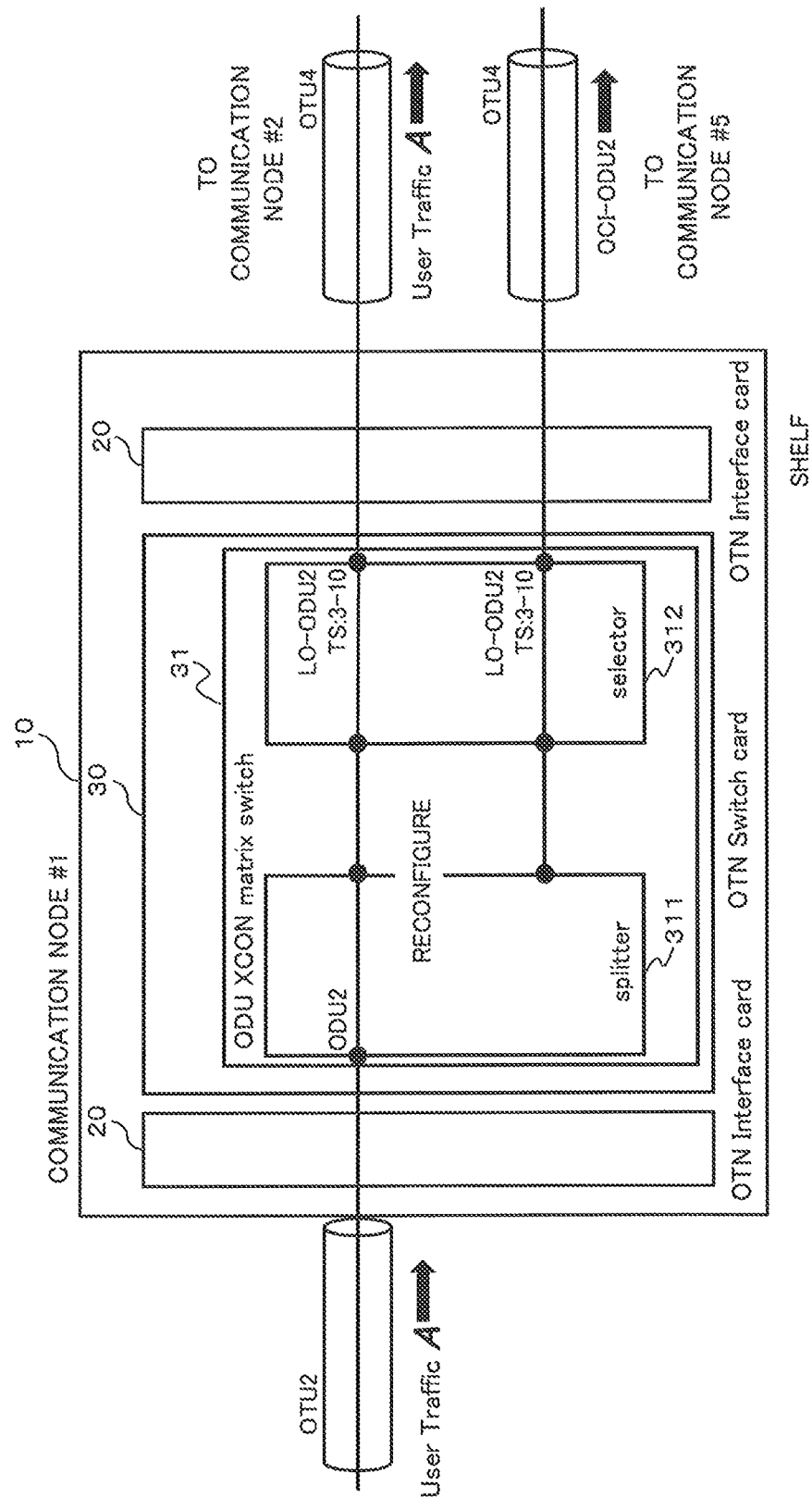
FIG. 31 is a diagram schematically illustrating a cross connect setting in a communication node #1 illustrated in FIG. 30.

Next, an example of path switching control when the signal transmission failure of one working path (for example, the working path A) is restored as illustrated in FIG. 30 from a state in which the signal transmission failures occurred in both of the working paths A and B as described above will be described. FIGS. 31 to 36 schematically illustrate cross connect setting examples in the communication nodes #1, #8, #5, #7, #4, and #9, respectively, when a failure is restored.

When the signal transmission failure between the communication nodes #2 and #3 is restored, the communication node #3 cancels transmission of the BDI-ODUk alarm to the upstream and transmission of the AIS-ODUk alarm to the downstream.

Thereby, the communication node #1 serving as the source node of the working path A and the protection path A becomes unavailable to receive the BDI-ODUk alarm through the working path A. In this case, the communication node #1 releases the physical connection setting on the protection path A, performs the physical connection setting on the working path A, and transmits the user traffic A to the working path A. Meanwhile, the communication node #1 transmits the OCI-ODUk alarm to the protection path A (see FIG. 31). Here, the ODUk frame of the user traffic A transmitted from the communication node #1 to the protection path A includes, for example, the link ID of the link A.

Figure 32:
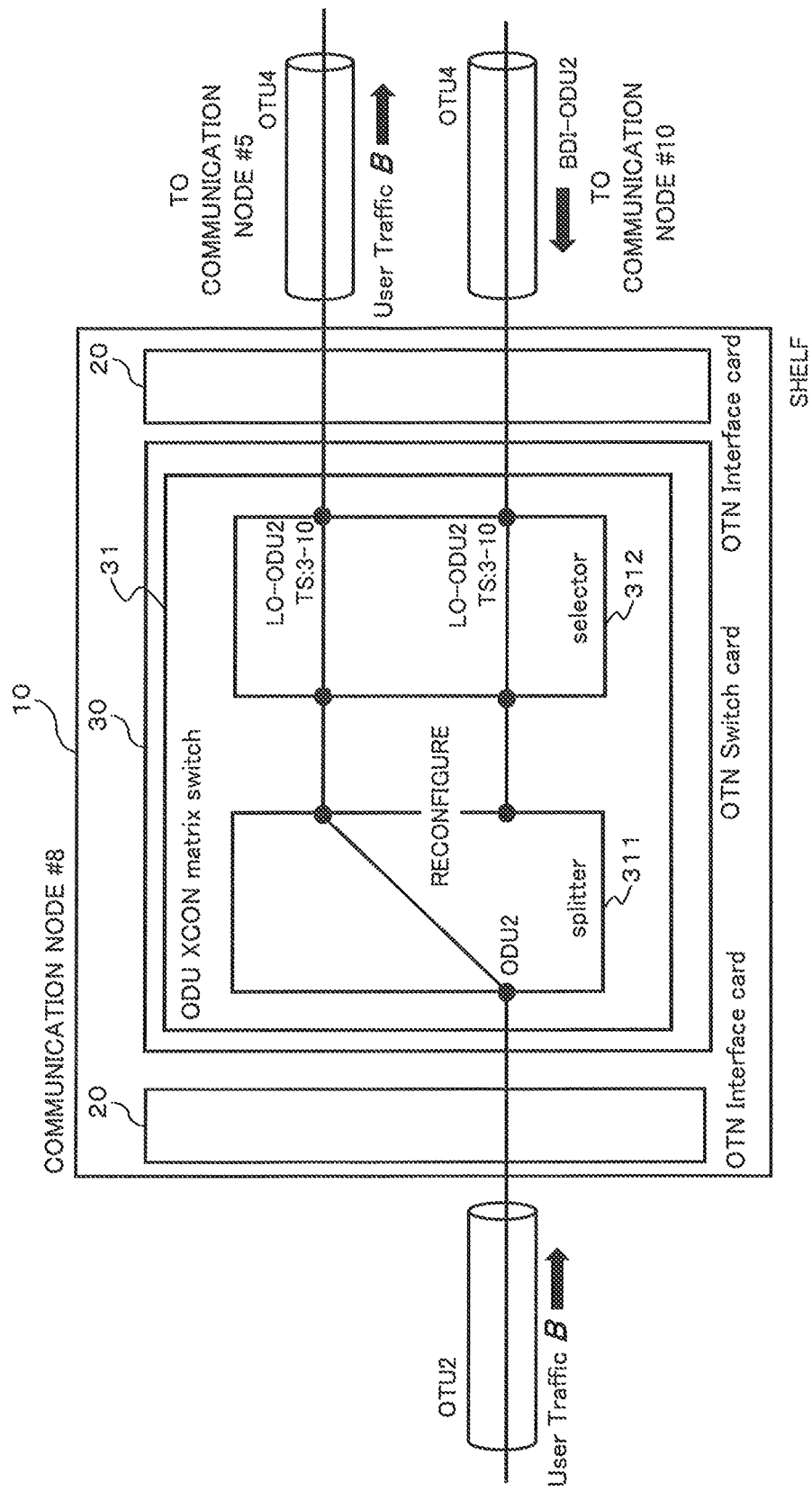
FIG. 32 is a diagram schematically illustrating a cross connect setting in a communication node #8 illustrated in FIG. 30.
Figure 33:
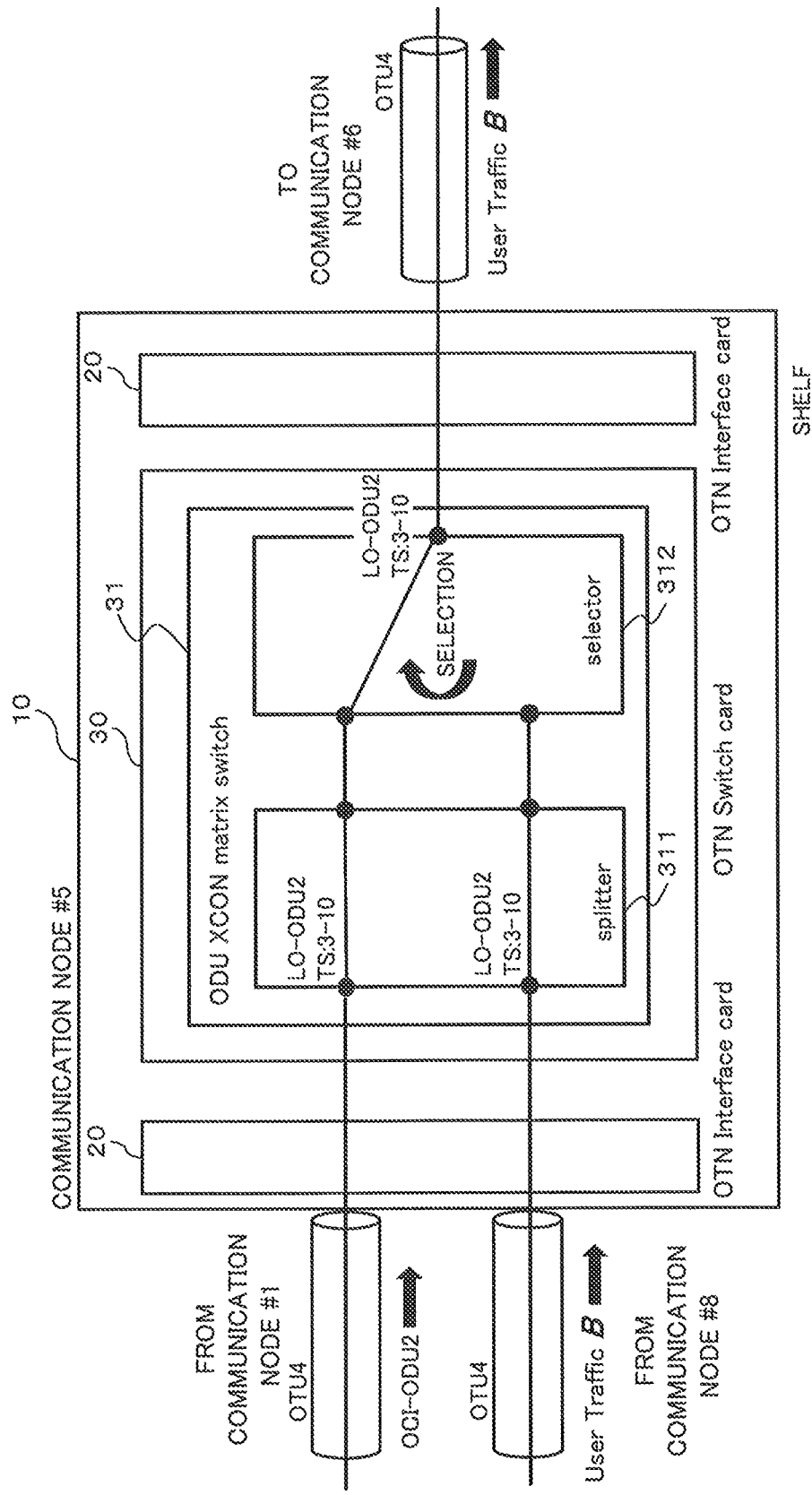
FIG. 33 is a diagram schematically illustrating a cross connect setting in a communication node #5 illustrated in FIG. 30.

Meanwhile, since the reception of the BDI-ODUk alarm through the working path B is detected in the communication node #8 serving as the source node of the working path B and the protection path B, the communication node #8 maintains the physical connection setting on the protection path B and transmits the user traffic B to the protection path B (see FIG. 32). Here, the ODUk frame of the user traffic B transmitted from the communication node #8 to the protection path B includes, for example, the link ID of the link B.

The communication node #5 serving as the source node of the common path C detects the reception of the OCI-ODUk alarm through the protection path A and receives the user traffic B through the protection path B (the OCI-ODUk alarm has been canceled). Thus, the communication node #5 selects by using the selector 312 the user traffic B to be transferred, which is received through the protection path B (see FIG. 33). Thereby, the user traffic B is transferred to the communication node #7 through the communication node #6.

Figure 34:
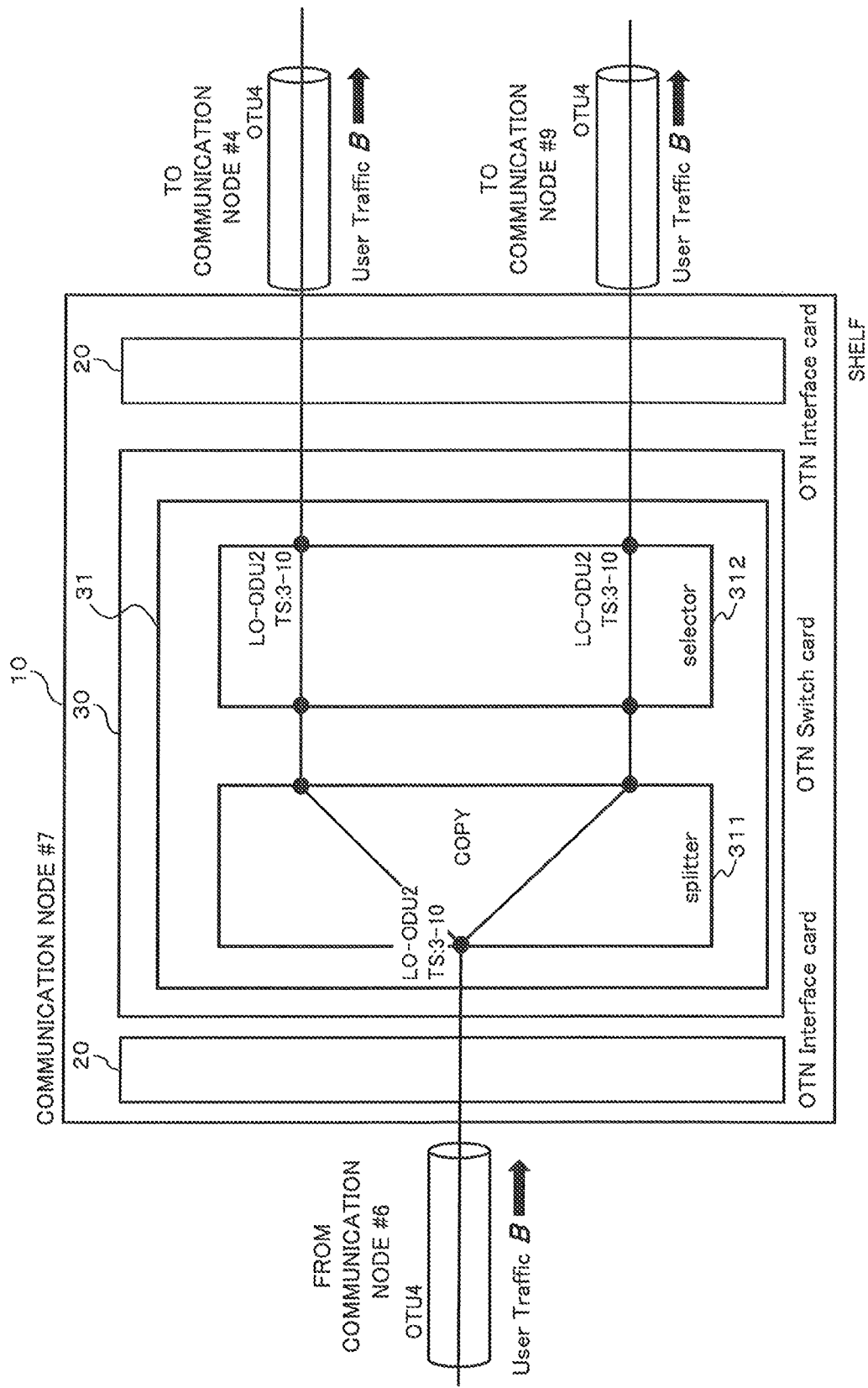
FIG. 34 is a diagram schematically illustrating a cross connect setting in a communication node #7 illustrated in FIG. 30.
Figure 35:
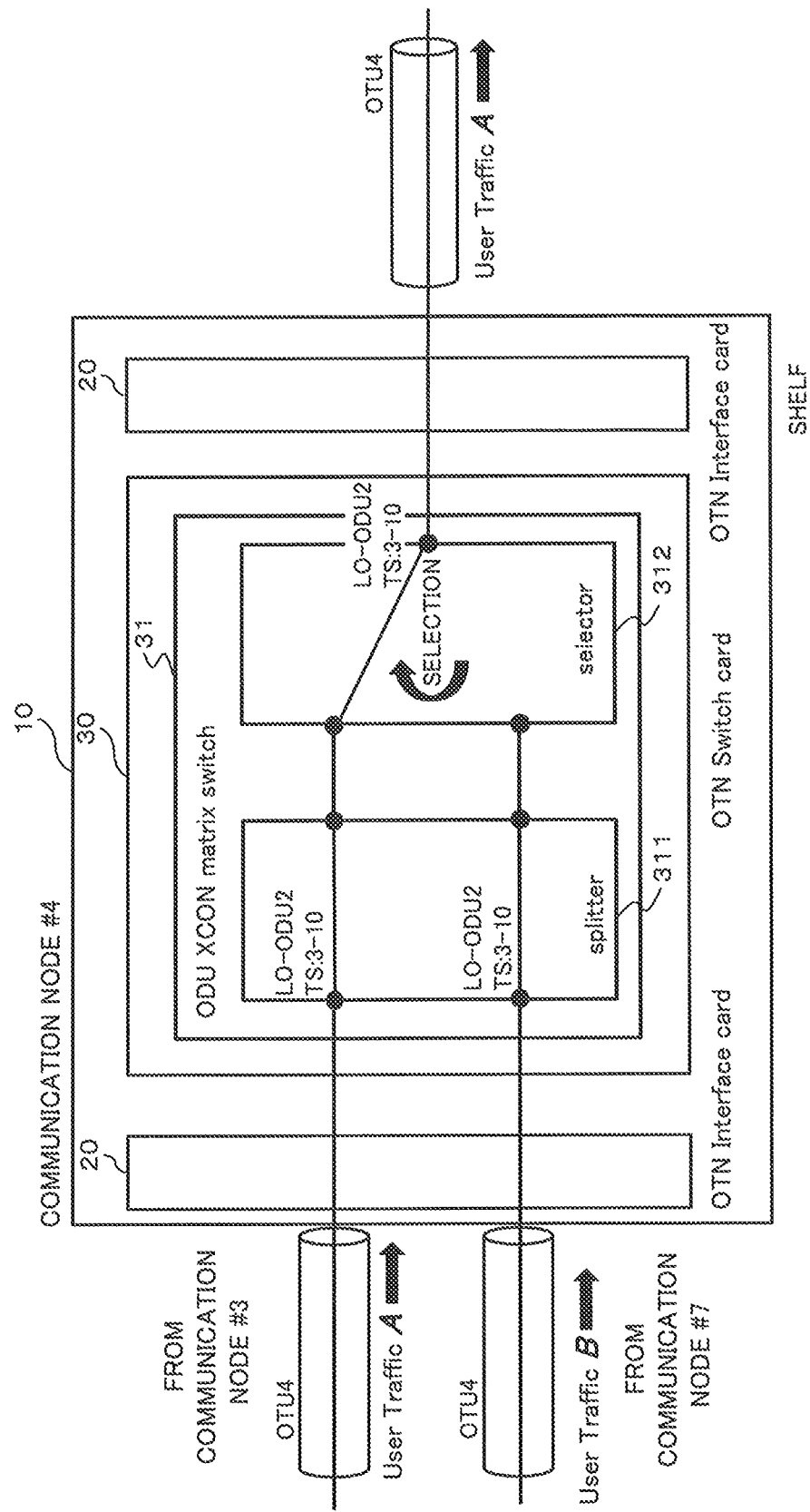
FIG. 35 is a diagram schematically illustrating a cross connect setting in a communication node #4 illustrated in FIG. 30.
Figure 36:
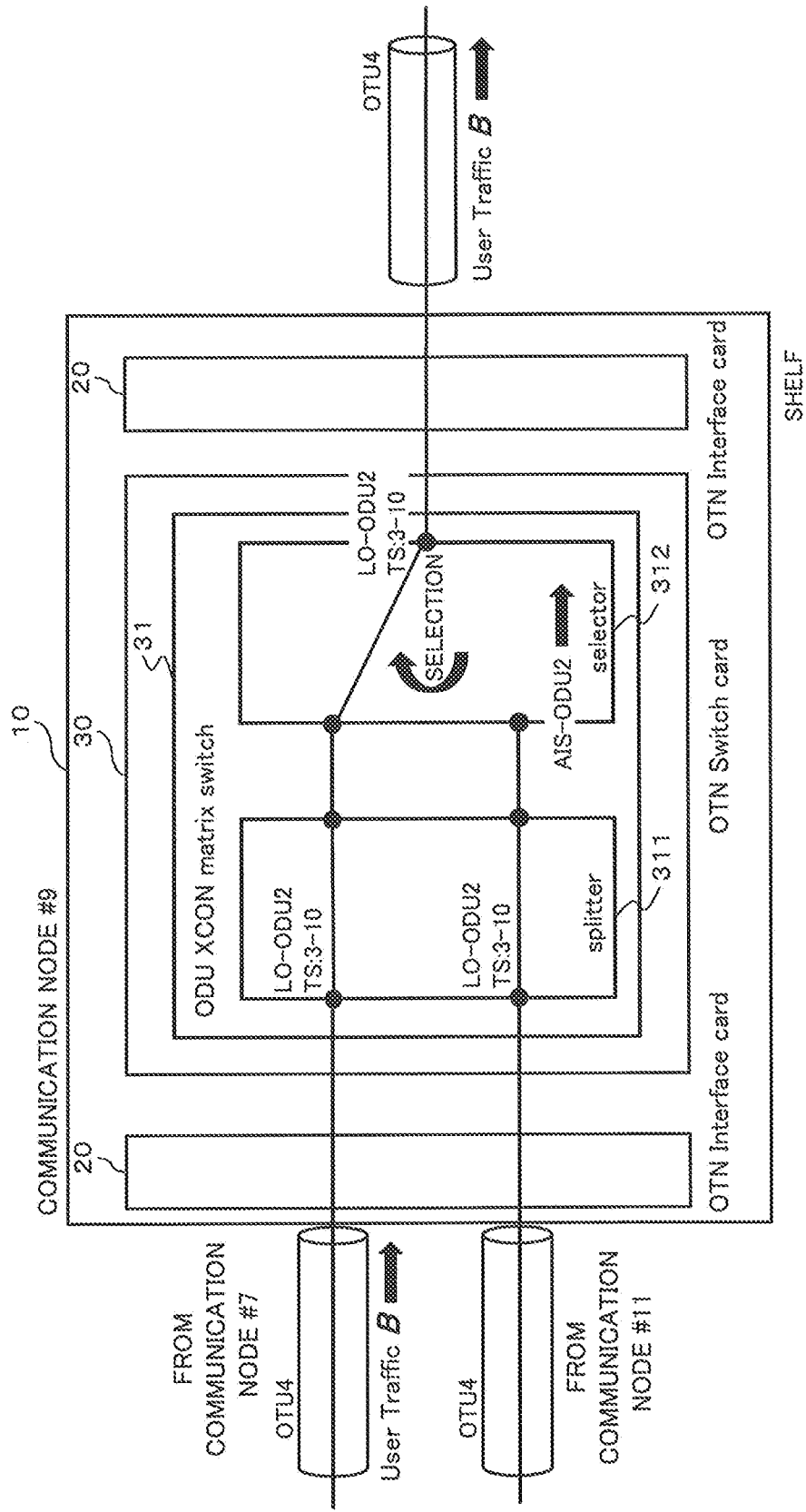
FIG. 36 is a diagram schematically illustrating a cross connect setting in a communication node #9 illustrated in FIG. 30.
Figure 37:
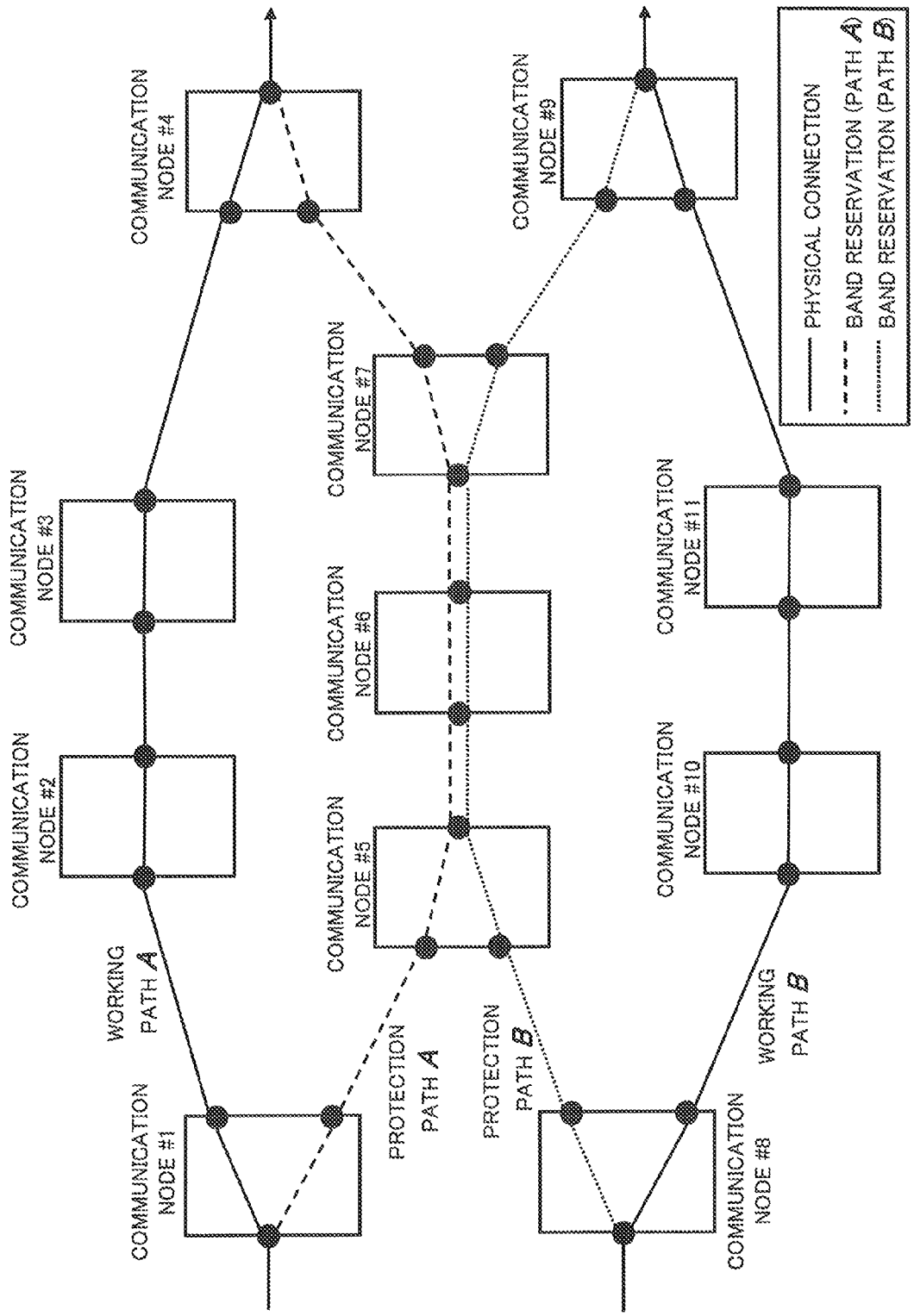
FIG. 37 is a diagram illustrating an exemplary network configuration in a shared restoration scheme.
Figure 38:
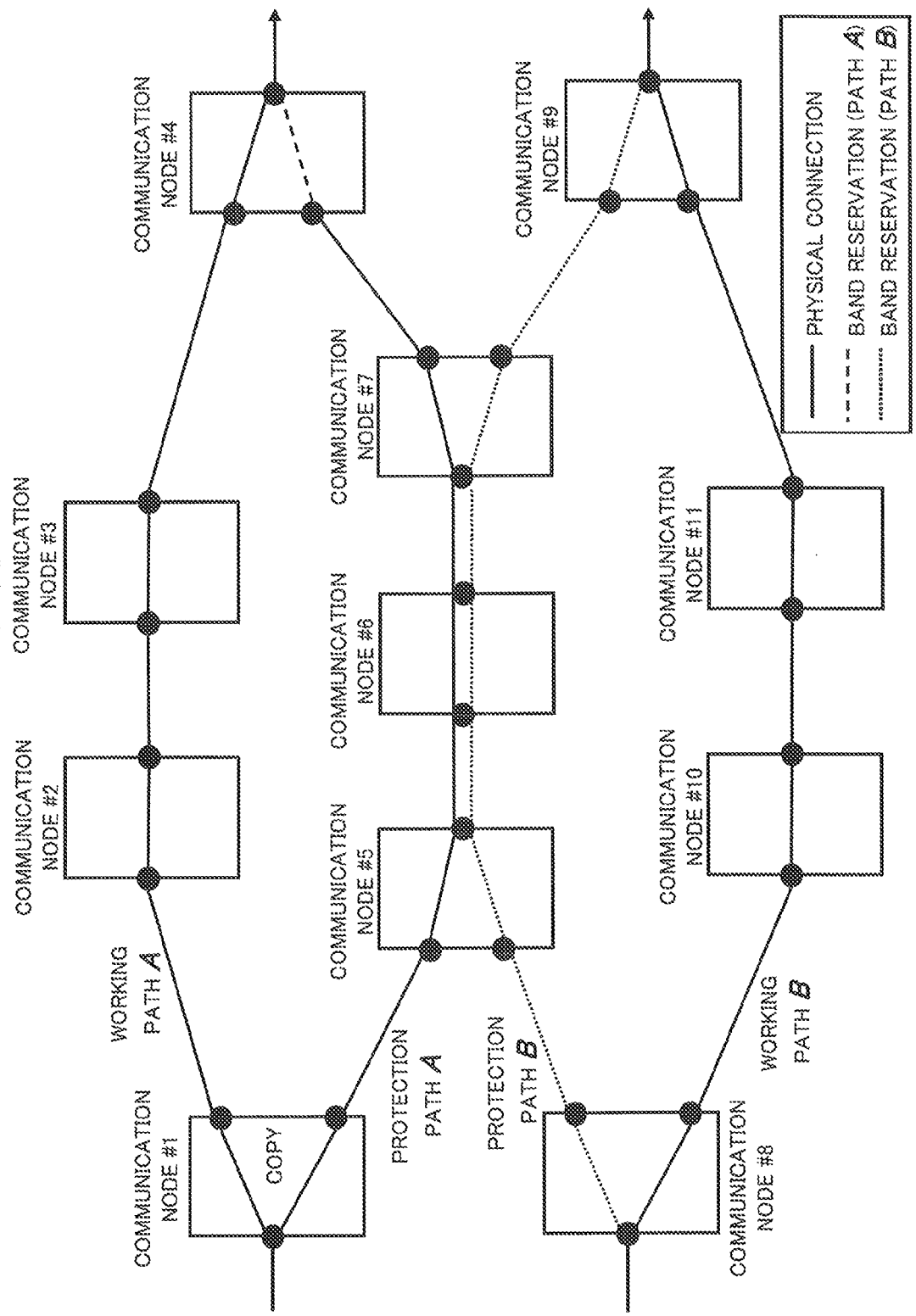
FIG. 38 is a diagram illustrating an exemplary network configuration before a failure occurs.

The end node #7 of the common path C copies the user traffic B received from the communication node #6 using the splitter 311 and transmits the user traffic B to the respective communication nodes #4 and #9 serving as the end node of the working paths A and B (see FIG. 34).

The end node #4 of the working path A receives the user traffic A including the link ID of the link A in the ODUk frame from the working path A. Meanwhile, the communication node #4 receives the user traffic B including the link ID of the link B in the ODUk frame from the protection path A (from the end node #7 of the common path C). The communication node #4 selects, for example, the working path A (the user traffic A) to be transferred based on the link ID using the selector 312 (see FIG. 35).

Meanwhile, the communication node #9 serving as the end node of the working path B receives the AIS-ODUk alarm from the working path B and receives the user traffic B including the link ID of the link B in the ODUk frame from the protection path B (from the end node #7 of the common path C). The communication node #9 selects by using the selector 312 the user traffic B received from the protection path B (the communication node #7) through which the AIS-ODUk alarm has not been received (see FIG. 36).

As described above, when the failure of the working path A is restored in the state in which the failures occurred in both of the working paths A and B, the protection path A can be switched back to the working path A, and the user traffic B of the working path B can be restored by the protection path B.

In the above-described example, when the failure of the working path A is cleared, the protection path A is switched back to the working path A but the protection path A is allowed not to be switched back to the working path A. However, the user traffic B of the working path B cannot be restored by the protection path B. Thus, it is preferable to switch the protection path A back to the working path A.

The operation according to the above-described embodiment may be summarized as set out below. The source nodes #1 and #8 of the working paths A and B allocate a link ID to the ODUk frame and transfer the user traffics A and B to the downstream communication nodes #2 and #10, respectively. Meanwhile, the source nodes #1 and #8 transmit the OCI-ODUk alarm to both of the protection paths A and B.

When the failure occurs in the working path A or B and the AIS-ODUk alarm or the BDI-ODUk alarm is detected, the source node #1 (or #8) switches the working path A (or the working path B) to the protection path A (or the protection path B).

The source node #5 which shares the protection paths A and B selects the ODUk frame to be transferred to the downstream communication node #6 (the common path C) in response to the detection of the OCI-ODUk alarm, the cancellation of the OCI-ODUk alarm, or the priority of the path.

The source node #7 which shares the protection paths A and B copies the ODUk frame received from the upstream communication node #6 through the common path C and transfers the same ODUk frame to the respective end nodes #4 and #9 of the working paths A and B.

The end node #4 (or #9) of the working path A (or B) determines whether the link IDs of the ODUk frames received from both of the working path A (or B) and the communication node #7 indicate a transferable frame and selects the ODUk frame to be transferred according to the determination result.

As described above, according to the present embodiment, even when a failure occurs in all of the working paths sharing the protection path, path switching can be performed quickly without transmitting a control signal such as the APS signal.

(Others)

In the above embodiment, an OTN has been described as an example of a communication network but the communication network may be, for example, any other network compatible to a synchronous digital hierarchy (SDH) or a synchronous optical network (SONET).

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication system, comprising:
a source node and an end node of a first working path;
a source node and an end node of a second working path; and
a source node and an end node of a common path serving as a protection path shared by the first and second working paths,
wherein the source node of the common path is configured to transfer one of signals received from the source nodes of the first and second working paths to the common path, and
the end node of the common path is configured to transmit the signal received through the common path to each of the end nodes of the first and second working paths.

2. The communication system according to claim 1,
wherein each of the source nodes of the first and second working paths transmits a dummy signal to the common path when a failure does not occur in the first and second working paths, and
when a failure occurs in either or both of the first and second working paths, the source node of the failure occurred working path transmits a client signal to be transmitted to the failure occurred working path to the source node of the common path.

3. The communication system according to claim 2,
wherein, upon receiving the client signal from one of the source nodes of the first and second working paths and the dummy signal from the other of the source nodes, the source node of the common path transfers the client signal to the common path.

4. The communication system according to claim 2,
wherein each of the source nodes of the first and second working paths allocates link identification information related to the working path to the client signal, and
each of the end nodes of the first and second working paths selects a signal to be transferred based on the link identification information allocated to the received client signal.

5. The communication system according to claim 3,
wherein each of the source nodes of the first and second working paths allocates link identification information related to the working path to the client signal, and
each of the end nodes of the first and second working paths selects a signal to be transferred based on the link identification information allocated to the received client signal.

6. The communication system according to claim 2,
wherein, in response to a recover of the failure occurred working path, the source node of the recovered working path transmits the client signal having been transferred to the source node of the common path to the recovered working path and transmits the dummy signal to the common path.

7. The communication system according to claim 3,
wherein, in response to a recover of the failure occurred working path, the source node of the recovered working path transmits the client signal having been transferred to the source node of the common path to the recovered working path and transmits the dummy signal to the common path.

8. The communication system according to claim 4,
wherein in response to a recover of the failure occurred working path, the source node of the recovered working path transmits the client signal having been transferred to the source node of the common path to the recovered working path and transmits the dummy signal to the common path.

9. The communication system according to claim 5,
wherein, in response to a recover of the failure occurred working path, the source node of the recovered working path transmits the client signal having been transferred to the source node of the common path to the recovered working path and transmits the dummy signal to the common path.

10. A communication control method in a communication system including a source node and an end node of a first working path, a source node and an end node of a second working path, and a source node and an end node of a common path serving as a protection path shared by the first and second working paths, the communication control method comprising:
transferring, from the source node of the common path, one of signals received from the source nodes of the first and second working paths to the common path; and
transmitting, from the end node of the common path, the signal received through the common path to each of the end nodes of the first and second working paths.

* * * * *